(12) United States Patent
Jahnke

(10) Patent No.: US 9,910,490 B2
(45) Date of Patent: Mar. 6, 2018

(54) SYSTEM AND METHOD OF CURSOR POSITION CONTROL BASED ON THE VESTIBULO-OCULAR REFLEX

(75) Inventor: Nathan A. Jahnke, Lubbock, TX (US)

(73) Assignee: EYEGUIDE, INC., Lubbock, TX (US)

( * ) Notice: Subject to any disclaimer, the term of this patent is extended or adjusted under 35 U.S.C. 154(b) by 1332 days.

(21) Appl. No.: 13/339,554

(22) Filed: Dec. 29, 2011

(65) Prior Publication Data
US 2013/0169533 A1 Jul. 4, 2013

(51) Int. Cl.
*G06F 3/01* (2006.01)

(52) U.S. Cl.
CPC ............ *G06F 3/013* (2013.01); *G06F 3/017* (2013.01)

(58) Field of Classification Search
CPC ........... G06F 3/033; G06F 3/013; G06F 3/017
See application file for complete search history.

(56) References Cited

U.S. PATENT DOCUMENTS

| | | | |
|---|---|---|---|
| 5,481,622 A * | 1/1996 | Gerhardt et al. | 382/103 |
| 5,583,795 A | 12/1996 | Smyth | |
| 6,091,334 A * | 7/2000 | Galiana et al. | 340/576 |
| 6,421,064 B1 | 7/2002 | Lemelson et al. | |
| 6,433,759 B1 * | 8/2002 | Richardson et al. | 345/7 |
| 6,578,962 B1 | 6/2003 | Amir et al. | |
| 6,637,883 B1 | 10/2003 | Tengshe et al. | |
| 7,130,447 B2 | 10/2006 | Aughey et al. | |
| 7,306,337 B2 | 12/2007 | Ji et al. | |
| 7,340,399 B2 | 3/2008 | Friedrich et al. | |
| 7,457,472 B2 | 11/2008 | Pace | |
| 7,572,008 B2 | 8/2009 | Elvesjo et al. | |
| 7,736,000 B2 | 6/2010 | Enriquez et al. | |
| 8,160,311 B1 * | 4/2012 | Schaefer | 382/118 |
| 2003/0098954 A1 * | 5/2003 | Amir et al. | 351/210 |
| 2004/0196433 A1 | 10/2004 | Durnell | |
| 2005/0015120 A1 | 1/2005 | Seibel | |
| 2005/0206583 A1 * | 9/2005 | Lemelson et al. | 345/7 |
| 2006/0110008 A1 | 5/2006 | Vertegaal et al. | |
| 2006/0147094 A1 | 7/2006 | Yoo | |
| 2006/0209013 A1 | 9/2006 | Fengels | |
| 2007/0159523 A1 | 7/2007 | Hillis et al. | |
| 2007/0164990 A1 | 7/2007 | Bjorklund et al. | |

(Continued)

OTHER PUBLICATIONS

Li, Dongheng et al., "Starburst: A Robust Algorithm for Video-Based Eye Tracking." Human Computer Interaction Program. Ames, Iowa; Sep. 5, 2005.

(Continued)

*Primary Examiner* — Richard Hong
(74) *Attorney, Agent, or Firm* — Mark E. Scott; Dickinson Wright PLLC

(57) ABSTRACT

Cursor position control based on the vestibulo-ocular reflex. At least some of the illustrative embodiments are methods including: creating a first video stream, the first video stream depicting an eye of user of a computer system, wherein a pupil of the eye changes position relative to a face of the user during use of the computer system by the user; tracking pupil position relative to the face of the user, the tracking by way of the first video stream; moving a cursor position on the display device, the moving responsive to changes in pupil position relative to the face of the user, and the moving in real time with pupil position changes; and adjusting cursor position based on the vestibulo-ocular reflex.

19 Claims, 12 Drawing Sheets

(56) References Cited

U.S. PATENT DOCUMENTS

| | | |
|---|---|---|
| 2008/0008399 A1 | 1/2008 | Marugame et al. |
| 2008/0074389 A1 | 3/2008 | Beale |
| 2009/0196460 A1 | 8/2009 | Jakobs et al. |
| 2009/0219386 A1 | 9/2009 | Ebisawa |
| 2010/0007665 A1 | 1/2010 | Smith et al. |
| 2010/0008424 A1 | 1/2010 | Pace |
| 2010/0027890 A1 | 2/2010 | Yoshinaga et al. |
| 2010/0053210 A1 | 3/2010 | Kon |
| 2010/0092049 A1 | 4/2010 | Schroeder et al. |
| 2010/0103375 A1 | 4/2010 | Chao |
| 2010/0109975 A1 | 5/2010 | Larson |
| 2010/0128118 A1 | 5/2010 | Swindells et al. |
| 2010/0208207 A1 | 8/2010 | Connell, II |
| 2010/0241992 A1* | 9/2010 | Zhang ............ 715/823 |
| 2011/0037941 A1 | 2/2011 | Reichow et al. |
| 2011/0051076 A1 | 3/2011 | Sugihara et al. |
| 2011/0085139 A1 | 4/2011 | Blixt et al. |
| 2012/0113209 A1 | 5/2012 | Ritchey et al. |
| 2012/0236025 A1 | 9/2012 | Jacobsen et al. |
| 2012/0272179 A1 | 10/2012 | Stafford |
| 2013/0169530 A1 | 7/2013 | Bhaskar et al. |
| 2013/0188834 A1 | 7/2013 | Ebisawa |

OTHER PUBLICATIONS

"ITU Gaze Tracker." ITU Gaze Group. n.d. Web. Retrieved Dec. 1, 2011.

"Blob Detection." Wikipedia.org. Web. Nov. 15, 2011. Retrieved Dec. 5, 2011.

Bradbury, Jeremy et al. "Hands on Cooking: Towards an Attentive Kitchen." Extended abstract in Proceedings of Conference on Human Factors in Computing Systems, pp. 996-997. Ft. Lauderdale, Florida. Apr. 2003.

\* cited by examiner

SYSTEM AND METHOD OF CURSOR POSITION CONTROL BASED ON THE VESTIBULO-OCULAR REFLEX

CROSS-REFERENCE TO RELATED APPLICATIONS

This application is related to the following co-pending and commonly assigned applications: application Ser. No. 13/339,543 filed Dec. 29, 2011 and titled "System and method of moving a cursor based on changes in pupil position" (CR Ref. 7090-00200); and application Ser. No. 13/339,527 filed Dec. 29, 2011 and titled "System and method of determining pupil center position" (CR Ref. 7090-00700).

BACKGROUND

Eye and/or gaze position tracking systems have many beneficial uses. For example, gaze position tracking systems may help disabled persons with cursor position control when using computer systems. Gaze position tracking may also find use in computer gaming, military applications, as well as assisting web-based advertisers in gauging advertising placement effectiveness.

In order to determine gaze direction, most if not all commercially available eye and/or gaze position tracking systems rely on reflections from the various portions of the eye, called Purkinje reflections, to track gaze direction. Purkinje reflections are not only small relative to the size of eye, but are also very faint, and thus systems based on Purkinje reflections use a high resolution digital camera directed toward the eye in order to discern the Purkinje reflections from other more prominent features. As a further difficulty, Purkinje reflections are affected by head position, and thus systems that rely on Purkinje reflections may require the user's head be held still or utilize additional systems (e.g., another camera) to compensate for head movement. Based at least on the hardware required to implement such systems, the cost of most commercially available systems is prohibitive for the great majority of prospective users.

Moreover, commercially available gaze position tracking systems in many cases require large text and icon sizes to compensate for lack of fine cursor position control. Thus, such commercially available systems may not be directly compatible with off-the-shelf portable and desktop computer systems.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Real time", with respect to cursor movement responsive to pupil movement, shall mean the cursor movement takes places within two seconds or less of movement of the pupil.

"Set of features points" shall mean a set having more than five members.

Calculating location of a particular portion of an eye within a field shall not be met by calculating location of the particular portion within a frame where both fields are present. Stated otherwise, operations on a frame into which both fields have been combined shall not be read to include operations on an individual field.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to aspects of a low cost eye tracking and cursor control system, including related software. More particularly, various embodiments may be directed to some or all of: use of an analog "low resolution" camera creating an interlaced video stream of a computer user's eye; improvements in pupil position determinations that enable real time cursor control based on pupil position; and systems in which there is no strict calibration of the eye position, and which may rely on head positions changes for fine cursor control. The specification first describes a high level overview of a system, and then discusses each sub-system in greater detail.

System Overview

Figure 1:
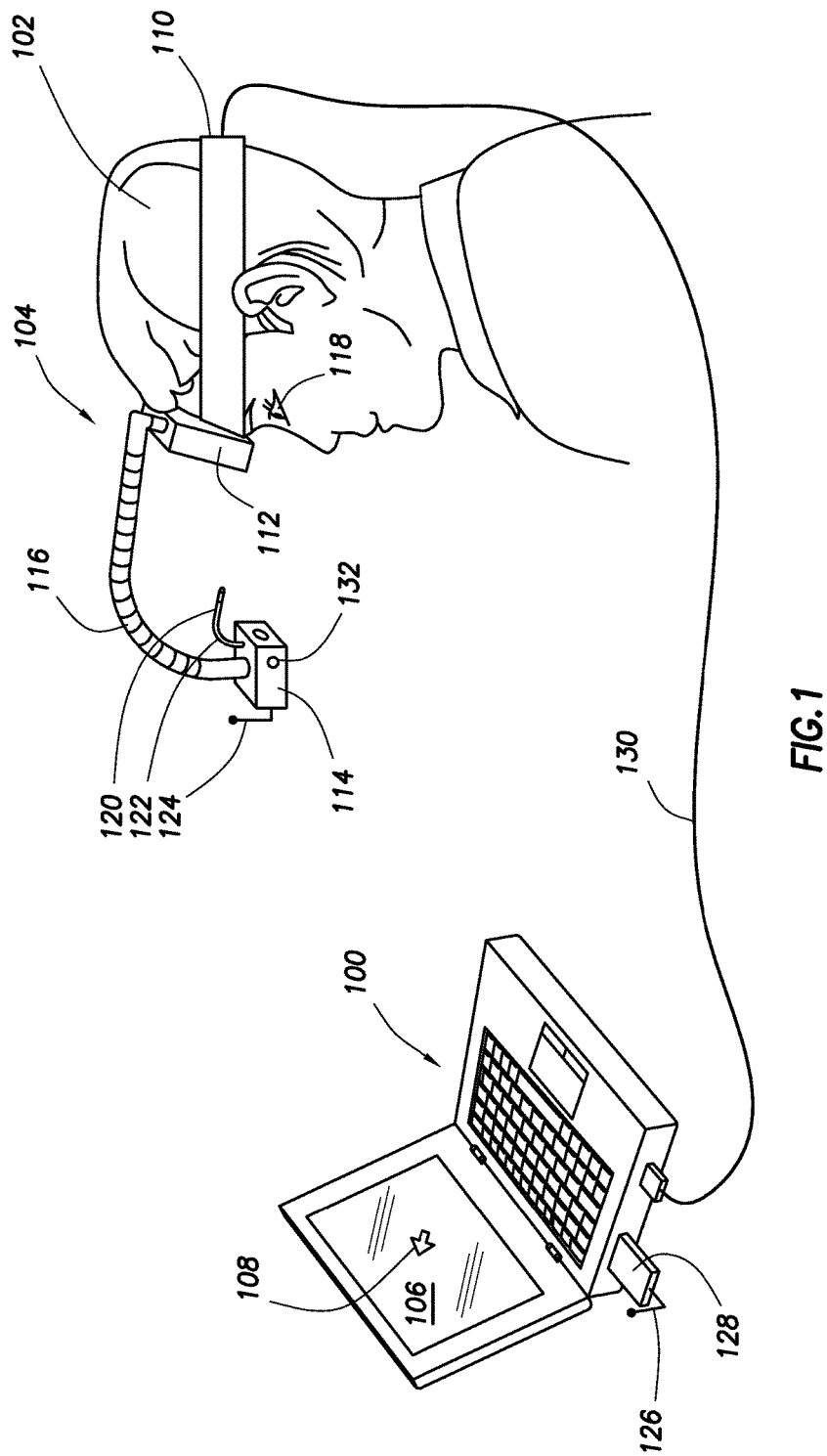
FIG. 1 shows a system in accordance with at least some embodiments.

FIG. 1 shows a perspective view of a system in accordance with at least some embodiments. In particular, FIG. 1 shows a computer system 100, a user 102 of the computer system, and a headset 104. Computer system 100 is illustratively shown as a laptop computer system, but the various embodiments find use on many different types of computer systems, including portable computer systems in their many forms, and desktop computer systems. The computer system 100 comprises a display device 106 upon which text and icons may be displayed. The display device 106 further displays a cursor 108, illustratively shown as an arrow, but other cursor types may also be used.

The illustrative headset 104 comprises a band portion 110 that circumscribes the head of the user 102. In some cases, the band portion 110 comprises an elastic band, but other systems and devices may be used to mount the headset 104 to the head of the user 102. The headset 104 further comprises a container portion 112 coupled to the band portion 110. As illustrated, the container portion 112 couples to the band portion 110 for placement proximate to the user's forehead, but the container portion 112 may be placed at any suitable location (e.g., back of the user's head, side of the user's head). The container portion 112 in accordance with at least some embodiments contains batteries to power operation of the camera 114. In yet still other cases, additional electronics may be placed within the container portion 112 (such as devices to receive sounds, and devices to send a video stream to the computer system 100).

Still referring to FIG. 1, the headset 104 further comprises a camera 114 coupled to the container portion 112. In some cases the camera 114 couples to the container portion 112 by way of a gooseneck or adjustable member 116 such that camera position can be adjusted after the headset 104 is placed on the user's head. Once adjusted the member 116 holds the camera 114 in a fixed position relative to the user's head during computer system use. In accordance with at least some embodiments, power to operate the camera 114 is provided by batteries within the container portion 112, and thus at least one electrical conductor may reside within the adjustable member 116. As will be discussed in greater detail below, the camera creates a video stream of the eye 118 of the user 102, and based on changes in position of the pupil of the eye 118 as shown on the video stream, the cursor 108 on the display device 106 is moved or adjusted.

In some embodiments, the eye 118 is illuminated by a light 120, which in some cases takes the form of at least one light emitting diode (LED). In a particular embodiment, the light 120 is a set of LEDs that generate infrared light, but other frequencies may be equivalently used. While in some cases the light 120 is rigidly coupled to the camera 114, in other cases the light 120 is coupled by a gooseneck or adjustable member 122 to enable adjusting the illumination direction of the light produced. Once adjusted, the member 122 holds the light 120 in a fixed position relative to the user's head during computer system use. While FIG. 1 illustratively shows the light 120 coupled to the camera 114, in other cases the light 120 may couple directly to the container portion 112 by way of a dedicated adjustable member. Much like the camera 114, the light 120 may draw power from batteries within the container portion 112.

The light 120 illuminates the eye 118, and the camera 114 creates a video stream depicting the eye 118. Inasmuch as the headset 104 is coupled to the head of the user and held fixed with respect to the head of the user, the video stream shows pupil position relative to the head or face of the user 102. The video stream may be provided to the computer system 100 in a variety of forms. For example, in some embodiments the video stream is wirelessly transmitted to the computer system 100 from the headset 104 (e.g., sent by way of electromagnetic waves propagating through the air between the headset 104 and the computer system 100). In embodiments where the video stream is wirelessly transmitted, the headset may comprise an antenna 124 from which the video stream is transmitted, and likewise the computer system 100 comprises an antenna 126 on which the wireless signal is received. The antenna 126 associated with the computer system 100 is shown coupled to the computer system by way of an expansion device 128, but in other cases any wireless communication system implemented by the computer system 100 (e.g., Bluetooth connection, wireless networking connection) may be used.

In yet still further embodiments, the video stream created by the camera 114 may be communicated to the computer system 100 by a hard wired connection, such as by communication cable 130. Communication cable 130, and the communication protocol used over the communication cable 130, may take many forms. For example, the communication cable may be a coaxial cable, a serial cable (e.g., RS232, Universal Serial Bus (USB)), or an Ethernet cable. In the illustrative case of a coaxial cable, the video signals may be transmitted directly over the cable. In the illustrative case of a serial cable or Ethernet cable, the video signal may be converted to digital form (if needed) and sent as a series of packet-based messages to the computer system 100. Thus, in some cases additional electronics (e.g., in container portion 112) may be configured to perform various file conversion and messaging tasks associated with sending the video stream from the headset 104 to the computer system 100.

Camera System

In accordance with at least some embodiments, the camera 114 is an analog camera that produces the video stream in the form of an interlaced analog video signal, which in some embodiments is broadcast wirelessly from the headset 104 to the computer system 100. Many sources provide suitable analog cameras, such as Kwesee Electronic Co., Ltd. of PingHu, China. The encoding scheme for the analog video signal may take any suitable form, such as National Television Standards Committee (NTSC), Phase Alternating Line (PAL), or Sequential Color with Memory (SECAM). In cases where the light 120 produces infrared light, the camera 114 may also comprise an optical filter to remove light in the visible frequencies. Moreover, in some embodiments the video stream produced by camera 114 in the form an analog camera may be an interlaced video signal comprising two fields per frame, where frames are delivered at a rate of greater than 20 frames per second, and in some cases about 25 frames per second.

To highlight the significance of use of an analog camera producing an interlaced video stream for cursor position control, the specification takes a brief diversion into related-art devices. In particular, most if not all commercially available related-art devices perform gaze control determinations based on Purkinje reflections. That is, related-art devices produce a known pattern of objects on or near the display device, such as brightly illuminated objects on the display device itself, or by way of a series of lights near the display device. The illuminated objects cause several Purkinje reflections from the various portions of the eye (e.g., the first Purkinje reflection from the outer surface of the cornea, and the fourth Purkinje reflection from the posterior surface of the lens). Determining gaze direction based on Purkinje reflections requires knowing the precise spatial relationship between the reflections. For this reason, systems that rely on Purkinje reflections for gaze direction determination use high resolution digital cameras that produce a non-interlaced video stream. Stated otherwise, the Purkinje reflections are difficult to detect because of their low intensity in the first instance, and the precise spatial relationship is used to determine gaze direction. Thus high-resolution digital cameras producing non-interlaced video are needed.

Returning to the various embodiments, the use of a "low resolution" analog camera producing interlaced video is highly non-intuitive for eye tracking systems. Firstly, for analog cameras producing interlaced video, each frame of video comprises two fields with each field produced at slightly different times. Thus, not only does the temporal difference between the fields lead to possible errors in gaze direction determinations based on Purkinje reflections, but the way the interlaced video is combined into a single frame the two fields may appear to be views from slightly different camera elevations. Various software techniques are discussed below to address the issues surrounding use of analog cameras, but price differential between "low resolution" analog cameras and high resolution digital cameras makes use of analog cameras favorable from a pricing perspective. It is noted, however, that the various embodiments are not limited to use of analog cameras, and use of high resolution digital cameras is also possible.

In the example embodiments using an analog camera, the expansion device 128 is a device capable of receiving the analog video stream broadcast by the headset 104, converting each field of each frame into a digital representation, and sending the digital representations of each field to software executing on the computer system 100. One suitable expansion device 128 is a model number ES-601WS wireless USB DVR available from Eye Sight Technology Co., Ltd. of Hong Kong (www.estcctv.com). While expansion device 128 noted is a Universal Serial Bus (USB) connected device, in the case of desktop computer systems the expansion device may be an internal expansion card (e.g., coupled to a PCI slot within the computer system), or may couple by other available communication ports and protocols (e.g., IEEE 1394 "firewire").

Voice Control Hardware

In some embodiments, the cursor control system also has an audio aspect. This section discusses hardware aspects of the audio, and the functionality of the audio aspects is discussed in later sections. In particular, in some embodiments the headset 104 implements a microphone for detecting audible commands of the user 102. In the illustrated embodiments, the camera 114 has an integrated microphone 132 which, being located in front of the user's face, is well positioned for detecting audio commands. Thus, in addition to wirelessly transmitting the analog video signal, the camera 114 may also wirelessly transmit the detected audio signal to the computer system 100.

In other embodiments, particularly where the camera 114 does not have an integrated microphone, the headset 104 may separately implement a microphone and transmitting circuitry. For example, the container portion 112 may have a microphone and related circuitry for detecting and sending an audio stream to the computer system 100. In yet still further embodiments, the microphone may be mounted on a dedicated adjustable member positioned near the user's 102 mouth.

The audio stream produced by the microphone associated with the headset 104 may be sent to the computer system 100 in any suitable form. For example, the audio stream may accompany the video stream wirelessly transmitted. The audio stream may be separately transmitted to the computer system 100 (e.g., on a different carrier frequency, or modulated onto a different sideband). The audio stream may be sent to the computer system over a hardwired connection, such as over communication cable 130. Moreover, the transmission technique for the video stream need not dictate the transmission technique for the audio stream, and thus even if the video stream is sent wirelessly, the audio stream may be sent over communication cable 130, and vice versa.

Further, even in systems that utilize voice control in some form, the headset 114 need not implement the microphone. In particular, in some embodiments a microphone of the computer system 100 may be used to detected voice commands, or the user may wear a ear-piece similar to those used with mobile phones, and which ear-piece wirelessly couples to the computer system (e.g., a Bluetooth connection).

Cursor Control Based on Vestibulo-Ocular Reflex

The specification now turns to example embodiments of cursor position control. In particular, in some embodiments cursor 108 on the display device 106 is moved by software executing on the computer system 100 based on changes in pupil position relative to the face of the user 102. In particular, camera 114 produces a video stream depicting the eye 118 of the user 102. Because the camera 114 is a part of the headset 104 coupled to the user's head, the camera 114 is held in a constant position relative the head or face of the user 102. It is noted that adjustable member 116 enables adjusting position of the camera 114 to place the eye 118 within the camera's view after the headset 104 is initially placed on the user's 102 head, but after such adjusting the member 116 holds the camera 114 in a fixed position. Thus an initial adjustment of camera position shall not obviate that, in use, the camera 114 is held in a constant position relative to the face. Moreover, minor position changes of the camera caused by rapid head movement shall not obviate that, in use, the camera 114 is held in a constant position relative to the face.

The video stream of the eye of the user 102 is sent to the computer system in any suitable manner (and as discussed above). The video stream is analyzed by software executing on the computer system 100 to determine pupil position within each frame. Example embodiments of how pupil position is determined within each frame are discussed in greater detail below. The focus of this section is the relationship between pupil position in the video stream, cursor position on the display device 106, and how the vestibulo-ocular reflex is used for cursor movement control.

Figure 2:
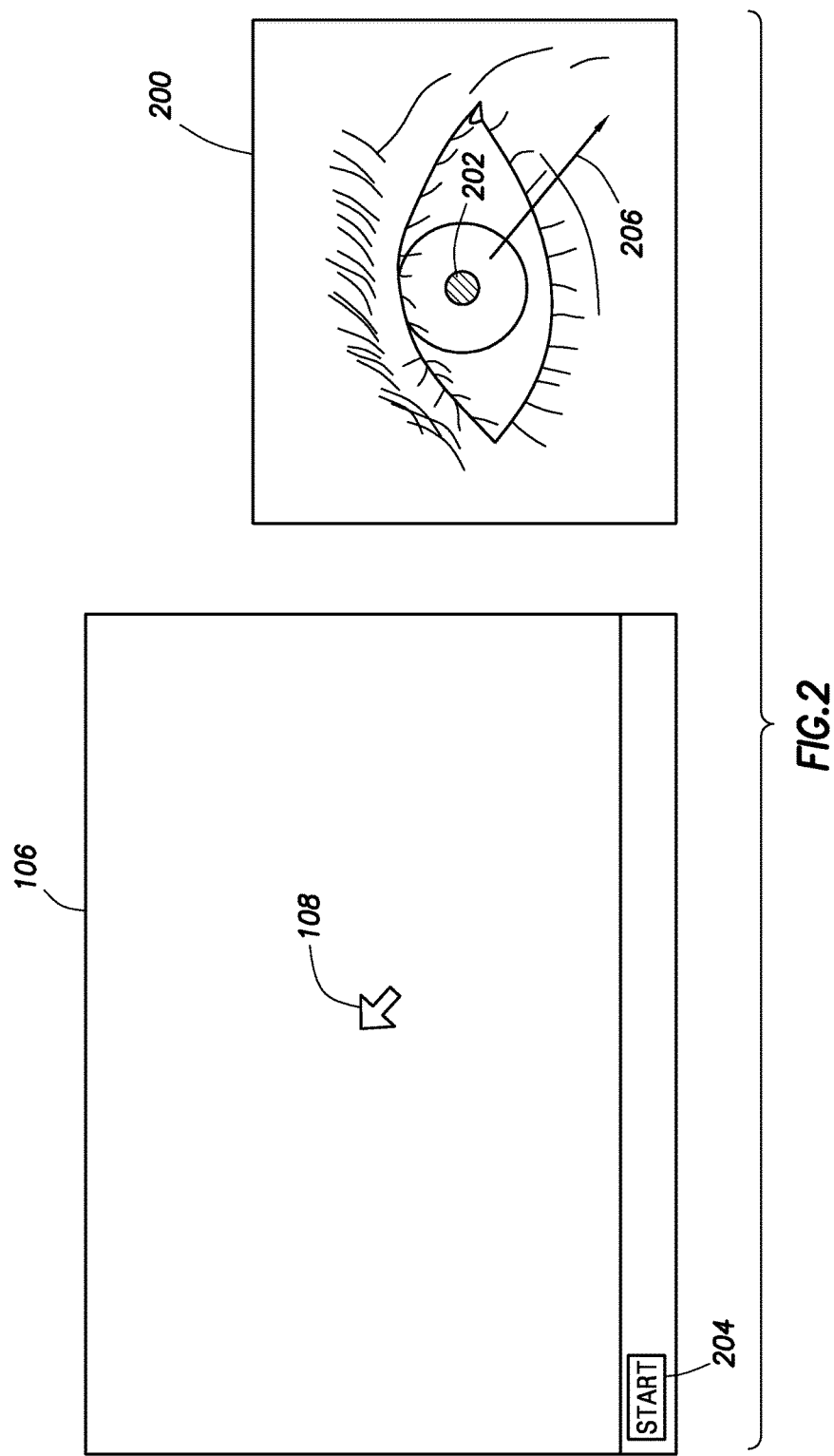
FIG. 2 shows both an illustrative display device, as well as an image of a user's eye, to explain cursor movement in accordance with at least some embodiments.

FIG. 2 shows a screen on display device 106, including cursor 108, along with a frame 200 of the video stream depicting an eye of the user, and in particular the pupil 202. It is noted that in some embodiments the software operates at the field rather than frame level; however, so as not to unduly complicate this portion of the specification, the description of this section refers to frames. In the system used for development of the various embodiments the screen size of the display device 106 was 1920 pixels by 1024 pixels (i.e., 1920×1024 resolution), but higher and lower resolution may be used. Further, in the system used for development of the various embodiments the resolution of the video stream as converted by the expansion device 128 was 384×288 pixels, but higher and lower resolution of the video stream as converted by the expansion device may be used.

A first illustrative step in moving the cursor 108 responsive to changes in pupil 202 position is relating or tying a particular pupil 202 position relative to the face of the user to a particular cursor position. In accordance with at least some embodiments, relating the particular pupil 202 position involves the user looking at the current cursor 108 position, and informing the computer system 100 that the current pupil 202 position and cursor 108 position coincide. In some cases, the user may press a keyboard key or mouse key to inform the software. In other cases the user may issue a voice command to inform the software. Regardless of the precise mechanism to inform the computer system 100 of the concurrence of pupil position and cursor position, the software executing on the computer system ties the pupil 202 position relative to the face to cursor 108 position, and then moves the cursor 108 responsive to changes in pupil 202 position relative to the face (i.e., changes in pupil position in the video stream). In illustrative FIG. 2, the cursor 108 is approximately centered on the display device 106, and likewise the pupil 202 is approximately centered in the frame 200, but such centering at the time of relating or tying is not strictly required. Moreover, it is noted that the pupil 202 and cursor position need be related or tied at only one location.

Now consider that the initial relating of pupil 202 position and cursor 108 position has been completed, and the user desires to move the cursor 108 from the approximately centered position toward a user interface widget on the display device 106, such as start button 204 in the lower left-hand corner of the display device 106. Initially the user holds the head in a substantially constant orientation, and moves the eye gaze toward the illustrative start button 204. Keeping in mind that the camera 114 producing the video stream is pointing away from the display device 106, given the initial cursor 108 position, in moving the gaze direction from the initial cursor 108 position toward the illustrative start button 204, the eye will move down and to the right as shown by arrow 206 to affect a movement of the cursor down and to the left in FIG. 2.

Figure 3:
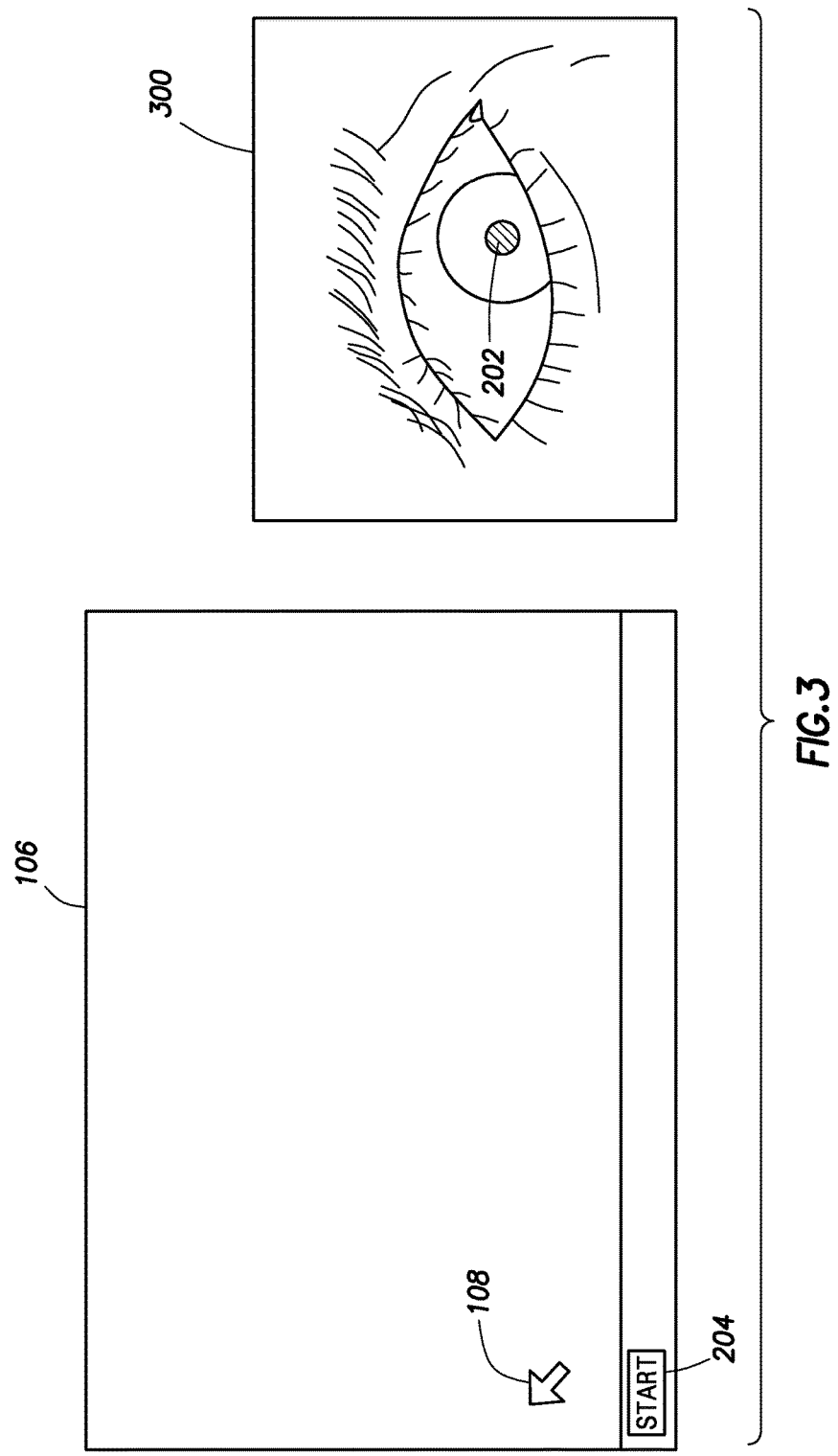
FIG. 3 shows both an illustrative display device, as well as an image of a user's eye, to explain cursor movement in accordance with at least some embodiments.

FIG. 3 shows the display device 106 and frame 300 after the user's gaze is directed upon the illustrative start button 204. Because of the change in gaze direction toward the illustrative start button 204, and because initially the user's head is held in a substantially constant orientation, the pupil position within frame 300 is shifted compared to that of frame 200. Moreover, the change in pupil position between FIGS. 2 and 3 may involve many frames, and thus FIGS. 2 and 3 are exaggerated for purposes of explanation. Software executing in the computer system 100 determines the change in position of the pupil 202 as between frames, and moves the cursor 106 proportional to change in pupil position and in real time with the movement of the pupil 202. Thus, the movement between the cursor 108 position in FIG. 2 and the cursor 108 position in FIG. 3 will take place in steps based on pupil 202 position within each frame between frame 200 and frame 300. This section of the specification is directed to cursor 108 control in a broad sense, and how the vestibulo-ocular reflex is used for fine cursor control. Illustrative mathematics associated with movement of the cursor responsive to the movement of the pupil, and several mathematical operations to smooth cursor movement and aid cursor placement, are discussed in greater detail below.

In some cases, cursor position may exactly match gaze direction on the display device 106 after a change in gaze direction. However, because gaze direction (as opposed to pupil 202 position within a frame) is not determined in accordance with various embodiments, the software executing in the computer system 100 does not know precisely where on the display device the user is looking. The software merely moves the cursor position responsive to changes in pupil position relative to the face of the user. Thus, though the user may be gazing directly at the illustrative start button 204 in this example, cursor position may not exactly match gaze direction as illustrated in FIG. 3. In accordance with at least some embodiments, the vestibulo-ocular reflex is relied upon to make small changes in cursor position.

The vestibulo-ocular reflex is a reflex that enables the eyes to remain gazing at a particular point in space in spite of head movement. For example, while gazing at a particular object in the distance, a downward head movement (e.g., a nod) results in the eyes moving upward relative to the face, and vice-versa for upward head movement. Likewise, while gazing at a particular object in the distance, moving the head to the left causes the eyes to move to the right relative to the face, and vice-versa for rightward head movement.

In illustrative FIG. 3, though the user in this example is gazing directly at the start button 204, the cursor 108 is slightly above the desired location. In accordance with at least some embodiments, adjustments to the cursor position are made by altering the head position while gazing at the desired location of the cursor. Based on the vestibulo-ocular reflex, the alteration of head position results in changes in pupil 202 position relative to the face and thus changes in pupil 202 position in the video stream in spite of the fact gaze position may remain unchanged. The changes in pupil position thus result in further movement of the cursor until the user has placed the cursor in the desired position on the display device 106. In the illustrative case of FIG. 3, an upward head movement by the user will result in the pupil 202 moving downward in the video stream, thus causing the cursor 108 position to move downward. That is, because the camera is held in a fixed relationship to the head and/or face of the user, the software of the computer system 100 cannot discern the difference between gaze direction changes and changes in head position for fixed gaze direction. Based solely on the further change in pupil 202 position, the cursor is moved by the computer system 100.

While the example discussed with respect to FIG. 3 illustrated adjustments to head position to lower cursor position on the display device, adjustments in the opposite direction are also contemplated. That is, if the cursor is slightly below the desired location, the user lowers the head slightly, and the vestibulo-ocular reflex raises pupil position relative to the face thus raising the cursor. Likewise for adjustments left and right, turning the head to the right results in left movement of the pupil and thus left movement of the cursor, and turning the head to the left results in right movement of the pupil and thus right movement of the cursor. While holding gaze on any particular object on the display device, if the user's head position is changed such that the pupil is at the same position relative to the face when the pupil position was related or tied to cursor position, the cursor moves back to the tied location. So, in the example situation on FIG. 3, even though the user may be gazing directly at the illustrative start button 204, changing head position to exactly match gaze direction will result in the cursor returning back to the original position (FIG. 2).

It is noted that most if not all commercially available systems for cursor position control move cursor position based on gaze direction relative to the display device, not pupil position relative to the face. The difference between such commercially available systems and various embodiments herein are highlighted by a simple example. Consider a user of a related-art system gazing upon the illustrative start button 204, and that cursor and gaze position match. If the user's head moves in this example but the gaze remains on the start button 204, no cursor movement will take place. That is, for related-art systems that determine gaze direction such as by glint tracking, in spite of head movement the action of the vestibulo-ocular reflex results in no change gaze direction, and thus no change in cursor position. It is noted that all eye tracking systems have a certain amount of positional jitter of the cursor associated with uncertainties in gaze direction determination, and thus the statement that there is no change in cursor position based on head movement shall not be obviated by underlying positional jitter and/or unintended cursor movement associated with such systems.

Moreover with respect to related-art systems, such systems perform a multi-point calibration of gaze direction and cursor position before use. Related-art systems require a calibration wherein the user sequentially gazes upon six or more (in most cases nine) locations on the screen, and the computer system creates a homography or transform function that relates detected gaze direction to cursor position on the screen. After the calibration and during use, gaze direction is provided to the transform function which outputs a cursor position. Because of the spatial relationship between the user's eye and the display device, in such calibrated systems relative changes in gaze direction to relative changes in cursor position are non-linear in the sense that amounts of movement of gaze direction to achieve cursor movement are different at different portions of the display device. To highlight the point regarding differences in relative movement, consider an exaggerated example a user's face being 10 centimeters (cm) from and centered with respect to a 60 cm display device (measured corner-to-corner). When gaze is directed near the center of the display device, greater changes in gaze direction are needed for a unit distance of cursor position movement than the for same unit distance of cursor position movement near the edge of the display device. Relating or tying a single gaze direction to a particular cursor position is inadequate to produce the transform function of the related-art.

Software Overview

Figure 4:
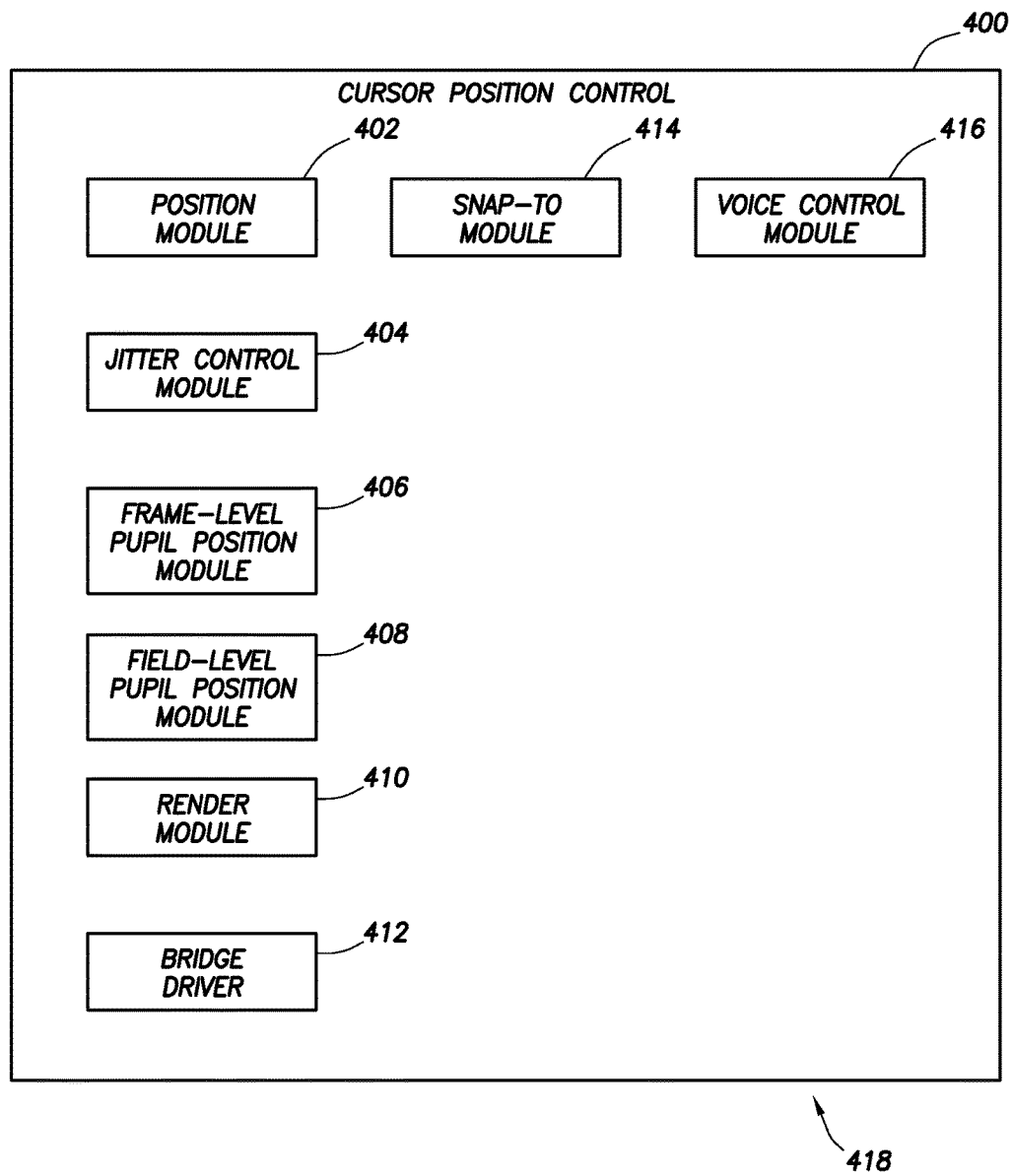
FIG. 4 shows a block diagram of software that may be implemented in accordance with at least some embodiments.

The specification now turns to a high level overview of the software that may be executed, at least in part, on the computer system 100 to implement cursor position control. In particular, FIG. 4 shows a block diagram depicting a high level overview of cursor position control software 400. Cursor position control software 400 illustratively comprises a plurality of modules that work together to create a proposed cursor position based on pupil position relative the face. The cursor position control software 400 may comprise a position module 402, a jitter control module 404, a frame-level pupil position module 406, a field-level pupil position module 408, a render module 410, a bridge driver 412, a snap-to module 414, and a voice control module 416.

The illustrative modules in column 418 may work together to ultimately generate a proposed cursor position based on pupil position relative to the face. In some cases, the proposed cursor position is directly implemented by the cursor position control software 400. However, in other cases the actual cursor position may be changed independent of pupil position based on the work of snap-to module 414. That is, in cases where a snap-to module 414 is implemented, the proposed cursor position generated by the position module 402 may be modified to move the cursor to user interface widgets in close proximity to the proposed and/or actual cursor position based on the work of the snap-to module 414. Further, voice control module 416 may affect changes in cursor position, and more particularly stop or reduce movement of the cursor when voice commands are detected, to ensure that if the voice command is related to cursor position such command may be decoded and implemented. Each software module in FIG. 4 is discussed in turn, starting with the position module 402. It is noted, however, that while the various functionalities are logically divided into separate modules for purposes of explanation, the various functionalities may be combined and/or divided in many different ways, yet all falling within the scope of the current disclosure.

Position Module

Figure 5:
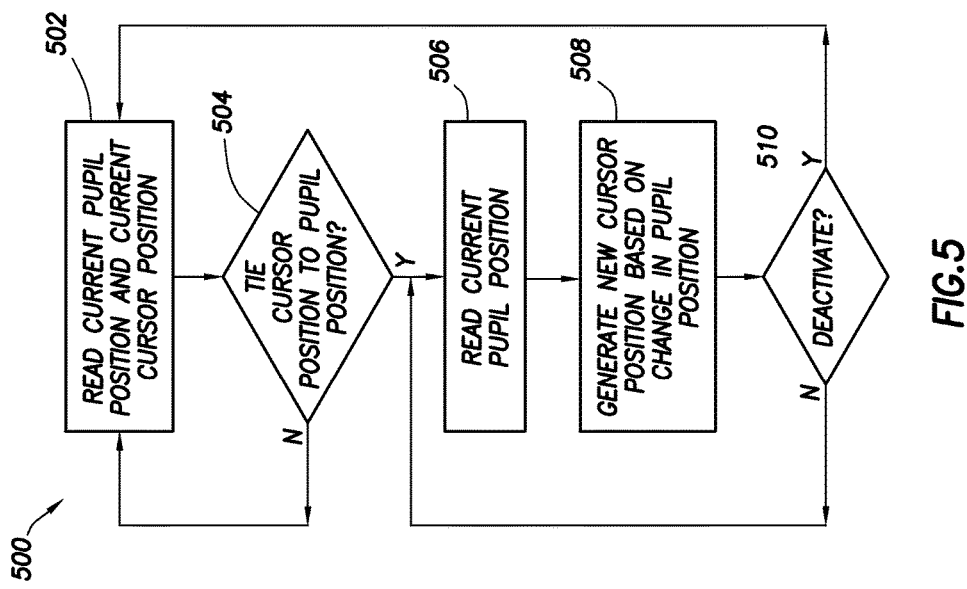
FIG. 5 shows a flow diagram of operation of a position module in accordance with at least some embodiments.

FIG. 5 shows an illustrative flow diagram 500 implemented by the position module 402 in accordance with at least some embodiments. In particular, initially the position module waits in a loop for the user to relate or tie cursor position to pupil position. That is, the position module 402 reads the current pupil position and cursor position (block 502), and then makes a determination as to whether the user has issued a command to tie the current pupil position and cursor position (block 504). If no, the position module loops until such time as a command to relate or tie is received. If yes, the position module 402 ties the current cursor position to the current pupil position (as discussed with respect to FIG. 2) (again block 504). The command to tie the current cursor position to the current pupil position may take many forms. In some cases, the user may press a keyboard key or mouse key to indicate the desire to tie the positions. In yet still other cases, the user may speak a voice command (received and decoded by the voice control module 416), which the position module 402 interprets as the command to tie the current respective positions. Relating or tying the current cursor position and current pupil position shall not be considered a calibration since tying a single point to a single pupil position provides no information about the relationship between changes in pupil position and related changes in cursor position.

In some embodiments, relating or tying current cursor position on the display device and current pupil position in the video stream of the eye may be thought of as a translation of the coordinate system in each case. That is, in most computer systems the upper left-hand corner of the display device is position 0,0, with the Y axis being the vertical axis and Y increasing with downward movement, and the X axis being the horizontal axis and X increasing to the right. Likewise for each frame of video stream of the eye. Relating or tying the current cursor position may thus be accomplished in some embodiments by a coordinate system transformations, with the location of the cursor at the time of tying becoming location 0,0 on the display device, and the location of the pupil at the time of tying being 0,0 on the video stream.

With the tying implemented in the form of the coordinate system transformation, in accordance with at least some embodiments each cursor X axis position on the display device (the cursor X axis position on the display device hereafter designated $X_C$) is directly related to the pupil X axis position in the frame (the pupil X axis position in the frame hereafter designated as $X_P$). In some cases, the relationship of the $X_C$ and $X_P$ may be provided according the following equation:

$$X_C = X_P * (\text{display height/frame height}) * C_X \quad (1)$$

where $X_C$ is the new cursor X axis position on the display device, $X_P$ is the current pupil X axis position in the frame, and $C_X$ is a constant. In many cases a value of 4 for $C_X$ provides good results, but other values for the constant may be used.

Likewise, each cursor Y axis position on the display device (the cursor Y axis position on the display device hereafter designated $Y_C$) is directly related to the pupil Y axis position in the frame (the pupil Y axis position in the frame hereafter designated as $Y_P$). In some case, the relationship of the $Y_C$ and $Y_P$ may be provided according the following equation:

$$Y_C = Y_P * (\text{display width/frame width}) * C_Y \quad (2)$$

where $Y_C$ is the new cursor Y axis position on the display device, $Y_P$ is the current pupil Y axis position in the frame, and $C_Y$ is a constant. In many cases a value of 4 for $C_Y$ also provides good results, but other values for the constant may be used, including values different than used for $C_X$.

Thus, each time the position module 402 executes the position portion of the loop, a new cursor position is generated based on the current pupil position. In some cases, the new cursor position is directly implemented by the cursor control program 400, but in other cases the actual cursor position implemented by the cursor position control software 400 may be different, such as position changes implemented responsive to the snap-to module 414 (discussed below), or holding position to give the voice control module 416 an opportunity to decode a suspected voice command (also discussed below).

Before proceeding to discuss the jitter control module 404, it is noted that illustrative position module may operate with any system or software that can pass pupil position indications to the position module. Thus, cursor position determinations made in conformance with operation of the position module 402 are not limited to field and/or frame level pupil position determinations discussed below, or the jitter control module discussed immediately below. Moreover, in the ideal case the position module 402 will run, or be scheduled to run by the operating system, such that each and every frame that is received can result in a new cursor position determination. However, depending on the operating system type, processor performance, and other factors, the position module 402 may not be scheduled to operate often enough to determine a new cursor position for every frame. The specification now turns to the jitter control module 404.

Jitter Control Module

Pupil position determinations involve uncertainty. Thus, even for situations where pupil position is held relatively constant, slight pupil position changes may still be indicated. The effect may be more pronounced in systems using an interlaced video stream of the eye, but even systems using high resolution digital cameras are not immune. The uncertainty in pupil position determination, if not managed, may result in rapid positional changes in cursor position, referred to as jitter. At least some embodiments discussed herein implement a jitter control module designed and constructed to reduce jitter in situations where the user is attempting to visually place the cursor at a particular location on the display device, yet still provide responsiveness for large cursor position changes. The illustrative jitter control module 404 of FIG. 4 logical resides between the frame-level pupil position module 406 and the position module 402 to implement reductions in cursor jitter. However, a jitter control module 404 is not strictly required, as the position module 402 could operate directly on pupil positions provided by the frame-level pupil position module 406.

More particularly, the illustrative jitter control module 404 receives a series of pupil positions from the frame-level position module 406. In some cases, the jitter control module may receive pupil positions at the frame rate, in some cases being about 25 frames per second. The jitter control module then passes pupil positions to the position module 402, but the jitter control module 404 performs, in some situations, a smoothing regarding pupil position before passing the positions to the position module 402.

Figure 6:
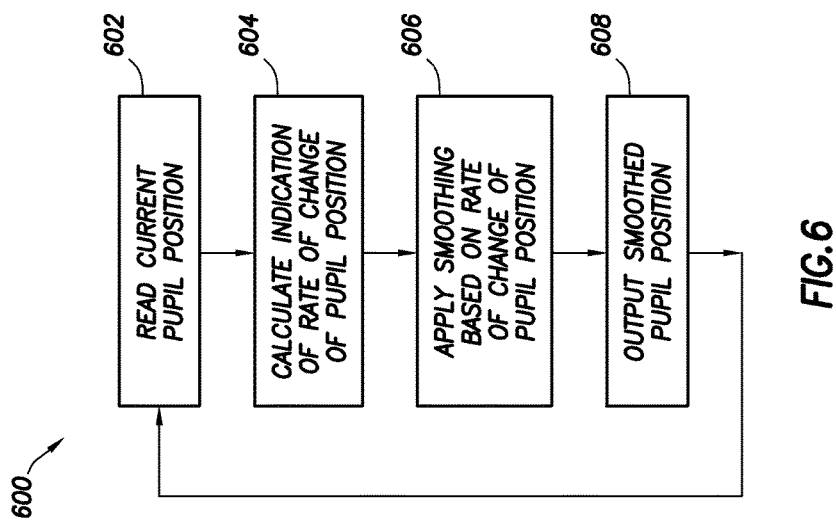
FIG. 6 shows a flow diagram of operation of a jitter control module in accordance with at least some embodiments.

FIG. 6 shows a flow diagram 600 for the jitter control module 404 in accordance with at least some embodiments. In particular, the illustrative method may involve reading the current pupil position (block 602). In some embodiments, the current pupil position may be read from or provided by the frame-level pupil position module 406, and thus pupil positions may be read at the frame rate of the video stream of the eye (e.g., about 25 frames per second). Based on the current pupil position, the illustrative method may involve calculating an indication of the rate of change of pupil position (block 604) over a predetermined period of time, or equivalently over a predetermined number of frames.

Calculating the indication of rate of change of pupil position may take many forms. In one example embodiment, the indication of rate of change involves calculating the standard deviation of the X position of the pupil over a predetermined number of frames, and likewise calculating the standard deviation of the Y position of the pupil over a predetermined number of frames. The standard deviations may be then be combined in some way (e.g., averaged), which combined standard deviation is thus the indication of rate of change of pupil position in these embodiments. Other mechanisms to calculate the indication of rate of change may be used, such as mathematical derivatives.

Regardless of the precise mechanism by which the indication of rate of change of pupil position is determined, the illustrative method may then proceed to apply smoothing based on the indication of rate of change of pupil position (block 606). The uncertainty in pupil position determinations, and the positional jitter of the cursor such uncertainty may cause, is most prominent when the user is attempting small cursor position changes, such as to move a cursor a few pixels to overlay a "clickable" user interface widget. Thus, in accordance with at least some embodiments, greater smoothing is applied during periods of time when the indication of rate of change of cursor position is small. Conversely, when large pupil position changes are in progress, the uncertainly is small in comparison the large changes, and thus lesser smoothing (and in some cases no smoothing) may be applied when the indication of rate of changes indicates large pupil position changes. Stated otherwise, the extent of smoothing applied may be inversely proportional to the indication of rate of change of the pupil position.

In accordance with a particular embodiment, smoothing is implemented as averaging pupil position over a variable number of frames to create a smoothed pupil position, which smoothed pupil position may then be output or provided to other software modules (block 608). More particularly still, a range of the indication of rate of change of pupil position may be associated with a predetermined range of smoothing frames (e.g., 1 smoothing frame to 20 smoothing frames). When the indication of rate of change is at a minimum value, the maximum number of smoothing frames may be used to create the smoothed pupil position, and conversely when the indication of rate of change is at a maximum value, the minimum number of smoothing frames may be used to created the smoothed pupil position. Thus, when a user's gaze is directed at a particular object on the display device, the indication of rate of change of pupil position will be low, and the number of frames averaged to create the smoothed pupil position will be high, thus reducing position jitter of the cursor. Conversely, when a user's gaze direction changes a substantial amount, the indication of rate of change of pupil position will be high, and the number of frames averaged to create the smoothed pupil position will be low, thus making the large position change of the cursor more responsive.

While the jitter control module 404 is shown as a separate module from the position module 402 and/or the frame-level pupil position module 406, the smoothing illustrative implemented by the jitter control module 404 may be alternatively incorporated directly into the frame-level pupil position module 406, the position module 402, or may be implemented at any other suitable time (e.g., such as on a field-by-field basis in the field-level pupil position module). The specification now turns to a description of the frame-level pupil position module 406.

Frame-Level Pupil Position Module

At least some embodiments utilize a camera 114 that creates an interlaced video stream. The illustrative interlaced video stream comprises two fields per frame, and the frame-level pupil position module makes pupil position determinations based on pupil position within fields of the frame. In the ideal case the frame-level position module 406 will run, or be scheduled to run by the operating system, such that pupil position within each field of a frame contributes to the frame-level pupil position result. However, depending on the operating system type, processor performance, and other factors, the frame-level position module 406 may not be scheduled to operate often enough to determine a new cursor position for each frame. Moreover, even if the frame-level pupil position module 406 is runs often enough, the upstream components (e.g., field-level pupil position module 408 that ideally runs at the field rate (about 50 fields per second)) may have scheduler shortcomings in attempting to find a pupil position within each field. Further still, even if both the frame-level pupil position module 406 and the field-level pupil position module 408 run often enough, there will be fields and/or frames within which no pupil position can be determined (e.g., when the user is blinking).

Figure 7:
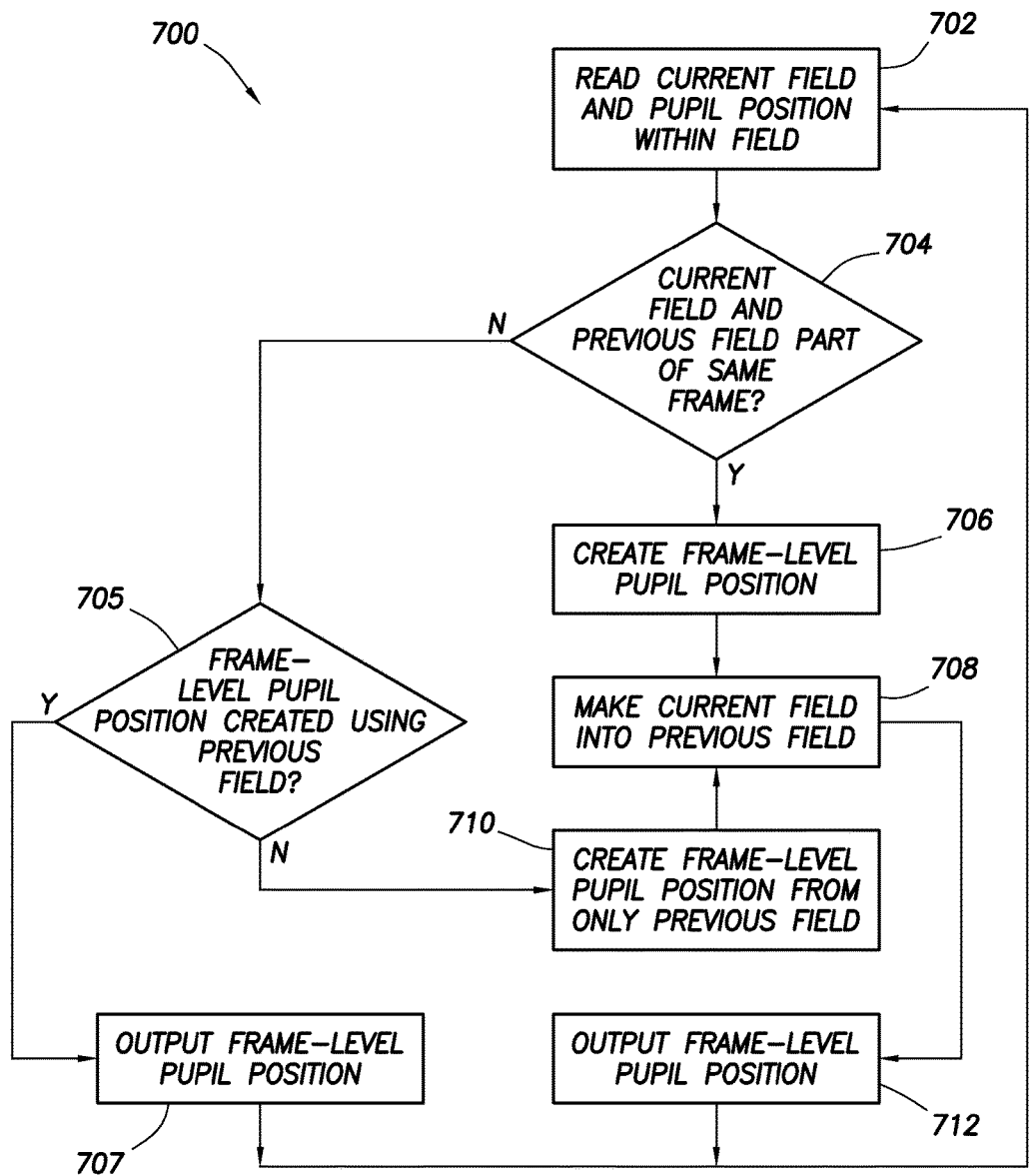
FIG. 7 shows a flow diagram of operation of a frame-level pupil position module in accordance with at least some embodiments.

FIG. 7 shows a flow diagram of operation of the frame-level pupil position module 406 in accordance with at least some embodiments. In particular, the illustrative method starts by reading the current field, and pupil position within the field (block 702). In some cases, reading of the current field may involve reading a predetermined set of locations in memory, but other mechanisms to pass the current field between modules is also contemplated. Moreover, pupil position may be read from the illustrative field-level pupil position module 408 (discussed below).

Next, a determination is made as to whether the current field and a previous field are part of the same frame (block 704). In some embodiments, metadata may be associated with a field that indicates whether the field is the "even" field in the interlaced frame or the "odd" field in the interlaced frame, but the metadata may not necessarily identify the particular frame to which the field belongs. Given the uncertainties in preemption of the software modules by the operating system in relation to the field rate, even if the current field and previous field are "odd" and "even" respectively, it is not necessarily the case that the fields are from the same frame. Thus, the determination of whether the current field and previous field are part of the same frame may involve comparing the fields at the bit level to make a determination of how closely related the two fields happen to be. Given that fields are recorded at slightly different—but very closely spaced—times, some differences are expected; however, significant differences between fields indicates the fields are from different frames. In other cases, the metadata may include an indication of the frame number to which each field belongs, and thus the determination as to whether fields belong to the same frame may involve a comparison of the indication of frame number within each field.

Assuming the fields are from the same frame, the illustrative method steps to creating a frame-level pupil position indication (block 706). The pupil positions with each field may be combined in any suitable way to arrive at a single pupil position for the frame. In a particular embodiment, the pupil positions are averaged to arrive at the single pupil position for the frame, but other techniques for combining the field-level pupil positions, including techniques that account for spatial relationships of the field within an overall frame, may be equivalently used. After creation of a frame-level pupil position (again block 706), the current field is made the previous field (block 708).

Returning to the decision block 704, if the current field and previous field are not part of the same frame, the illustrative method determines whether a frame-level pupil position has been created using the previous field (block 705). That is, if in a previous execution of the method 700 a frame-level pupil position was created using two fields (at block 706) and the then-current field was made into the previous field (at block 708), then the previous field on the subsequent execution has already contributed to a frame-level pupil position. Thus, the current field is turned into the previous field (block 707) and no frame-level pupil position is determined.

Returning to the decision block 705, if the previous field has not contributed to a frame-level pupil position determination, the second field from the frame may have been missed and thus the illustrative method proceeds to creating a frame-level pupil position from only the previous field (block 710). That is, for whatever reason, only one field of the particular frame has been provided and thus the pupil position of the frame to which the field belongs is assigned directly to the pupil position within the frame. The reasons the current and previous fields may not be from the same frame may be based on how the operating system schedules processes, but may also be based on other factors. For example, the field-level pupil position module 408 may refrain from passing a field to the frame-level position module 406 if no pupil position was found (e.g., the field was taken during a period of time when the user's eyelid was closed).

After making a frame-level pupil position determination based on a single field (again block 710), or making a frame-level pupil position determination based on both fields (again block 706), the next step in the illustrative method involves making the current field into the previous field (block 708). In a particular embodiment, making the current field the previous field involves moving the field from a first predetermined set of memory locations in system memory to a second predetermined memory location in the memory. Other mechanisms may be equivalently used, such as changing metadata associated with the field, or a circular buffer where a memory pointer is moved to a new location. Next, the illustrative method outputs or provides the frame-level pupil position to other modules (e.g., the jitter control module 404, or directly the position module 402), and then the illustrative method begins again. The specification now turns to the field-level pupil position module 408.

Field-Level Pupil Position Module

Again, at least some embodiments utilize a camera 114 that creates an interlaced video stream comprising two fields per frame. In the ideal case the field-level pupil position module 408 will run, or be scheduled to run by the operating system, such that pupil position within each field may be determined. However, depending on the operating system type, processor performance, and other factors, the field-level pupil position module 408 may not be scheduled to operate often enough to determine a new pupil position for each and every field—some fields may be missed. Moreover, even if the field-level pupil position module 408 runs often enough, the upstream components (e.g., render module 410, bridge driver module 412) may have preemption issues in attempting to provide fields for analysis.

Many types of pupil position determinations have been disclosed in relevant publications, and may be implemented with respect to field-level images of the eye used by the field-level pupil position module 408. Many such related-art mechanisms, however, have accuracy issues in determining pupil position. For example, some related-art systems perform blob detection or blob analysis, which may result in significant errors in pupil center position determination. However, systems that implement jitter-control module 404 may operate sufficiently well with a field-level pupil position module 408 making pupil position determinations based solely on per-field blob analysis.

Another example related-art system may utilize the Random Sample Consensus (RANSAC) system, which randomly selects feature points from the all the available feature points, and performs ellipse fitting to the randomly selected feature points. For example, Dongheng Li et al. in their paper titled "Starbust: A robust algorithm for video-based eye tracking" (Elsevier Science, September 2005) describe a system where, after glint removal, RANSAC is iteratively performed. An example shortcoming of a RANSAC system is time. While under a random sampling theory eventually a selected set of feature points may accurately define an ellipse that represents the pupil, the method assumes an unlimited amount of time to arrive at the random sample. However, the random sample that actually yields the best result may not appear until many thousands or hundreds of thousands of sample sets into the process. Moreover, the Li system requires glint removal prior to feature detection, and thus RANSAC systems such as Li are computationally expensive. Again however, systems that have sufficient processing power to overcome the timing issue associated with random sampling may operate sufficiently well as a field-level pupil position module 408 making pupil position determinations.

Figure 8:
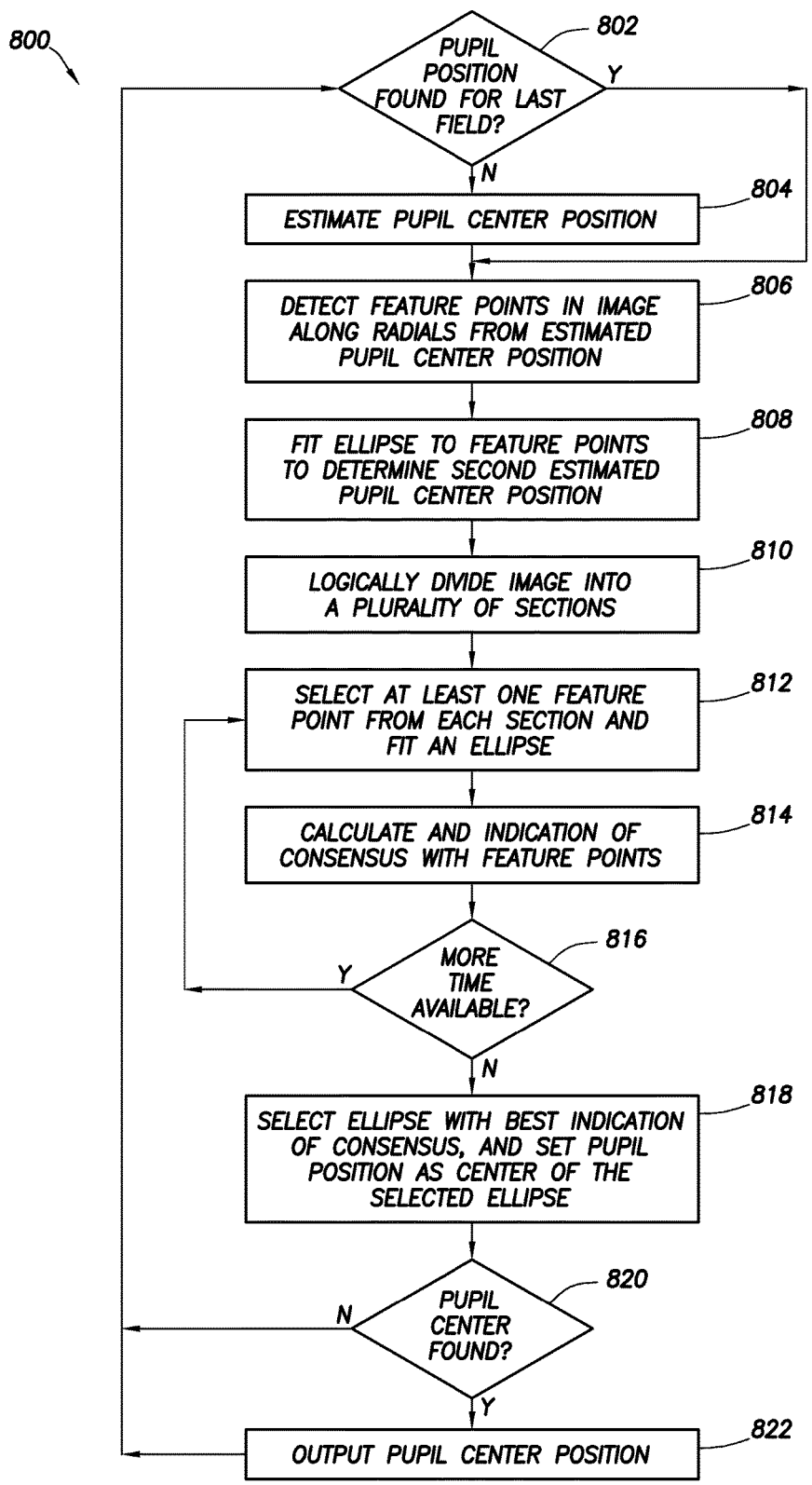
FIG. 8 shows a flow diagram of operation of a field-level pupil position module in accordance with at least some embodiments.

While many pupil detection algorithms may be implemented as the field-level pupil position module 408, the specification describes a particularly efficient method of determining pupil position within each field, which method may increase accuracy of the pupil position determination within each field and/or which may reduce processor loading with respect to determining pupil position. In particular, FIG. 8 shows a flow diagram 800 of operation of the field-level pupil position module 408 in accordance with at least some embodiments. The illustrative method starts by making a determination as to whether a pupil position was found in the last field (block 802). Though the video stream that creates the fields may be a video stream of the eye, there will be fields and frames in which no pupil position can be found, such as fields and/or frames created during periods of time when the eyelid is closed (e.g., the user is blinking).

If no pupil position was found in the last field (block 802), the illustrative method proceeds to estimating a pupil center position (block 804). The estimate of pupil center position may take any suitable form. In some cases, the illustrative method may perform a blob analysis or blob detection on the image of the field, and thus create a first estimated pupil center position being the center of the blob corresponding to the pupil. Other mechanisms to create the first estimated pupil center position may be used, with the understanding that the estimate may have fairly significant error, yet still be usable.

Figure 9:
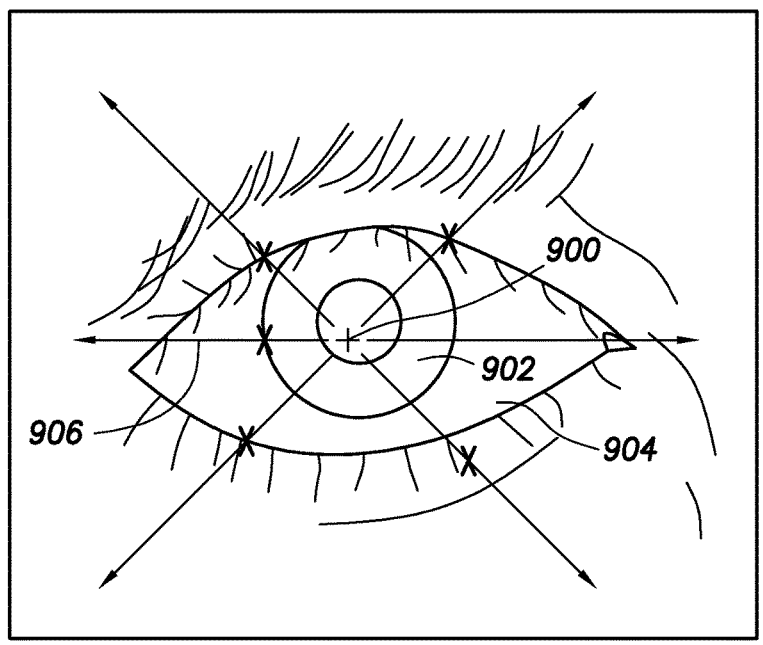
FIG. 9 shows an image of a user's eye, and also illustratively showing radially extending lines and feature points in accordance with at least some embodiments.

In the event a pupil center was found for the last frame (again block 802), the pupil center position from the last frame is set to be the first estimated pupil center position, otherwise the estimated pupil center position from block 804 is set to be the first estimated pupil center position. The next step in the illustrative method is to detect feature points in the image of the field along radial lines logically extending from the first estimated pupil center position (block 806). FIG. 9 shows a field of a video stream depicting an eye of the user, and also shows the first estimated pupil center position 900. Note how the first estimated pupil center position does not exactly correspond with the actual pupil center position. Moreover, FIG. 9 shows illustrative radial lines or vectors extending from the position 900. It is to be understood that the illustrative radially extending lines are not actually present in the field, but instead the radially extending lines illustrate the logical paths the field-level pupil position module may traverse while detecting feature points. Moreover, so as not to unduly complicate the figure, only six such radially extending lines are shown, but many hundreds or thousands of such radially extending lines may be used as part of feature detection.

Any suitable feature detection algorithm may be used. At the high level, the feature detection algorithm searches along a path and attempts to find the interface of edge of the iris 902 and the sclera 904 (i.e., white of the eye). In many cases, the algorithm places a feature point at locations where abrupt changes in intensity are found. In accordance with at least some embodiments, the fields are converted to monochrome before analysis by the field-level pupil position module 408 (e.g., converted by the render module 410), but feature points may be equivalently identified in color representations as well. Thus, along each radially extending line around the entire eye, feature points are located. FIG. 9 shows a plurality of illustrative feature points, each illustrative feature point shown in FIG. 9 by an "X". In some cases, the feature point detection may accurately detect the location of the interface of the iris 902 and sclera 904, such as along illustrative radially extending line 906. However, misidentification is frequent, particularly in locations where the eyelashes of the upper eyelid extend over the eye. Before proceeding, it is noted that the first estimated pupil center position 900 is merely an estimate, and though in some cases the estimate may be close to the actual pupil center, in other cases the first estimated pupil center position 900 may have significant error. For example, when the user's iris is very light (e.g., light blue) distinguishing the pupil from the iris may be easy using an illustrative blob analysis program. On the other hand, when the user's iris is very dark (e.g., dark brown) distinguishing the pupil from the iris may be difficult using an illustrative blob analysis program.

Returning again to FIG. 8, the next step in the illustrative process is to fit an ellipse to most if not all the feature points determined (block 808), thereby creating a full-set ellipse. Any suitable mathematical system may be used to calculate the full-set ellipse, such as a least squares method. The center of the full-set ellipse thus becomes a second estimated pupil center position. In many cases, the second estimated pupil center position will be a more accurate estimated of the pupil center position than the first estimated pupil center position, but not necessarily in every case.

Figure 10:
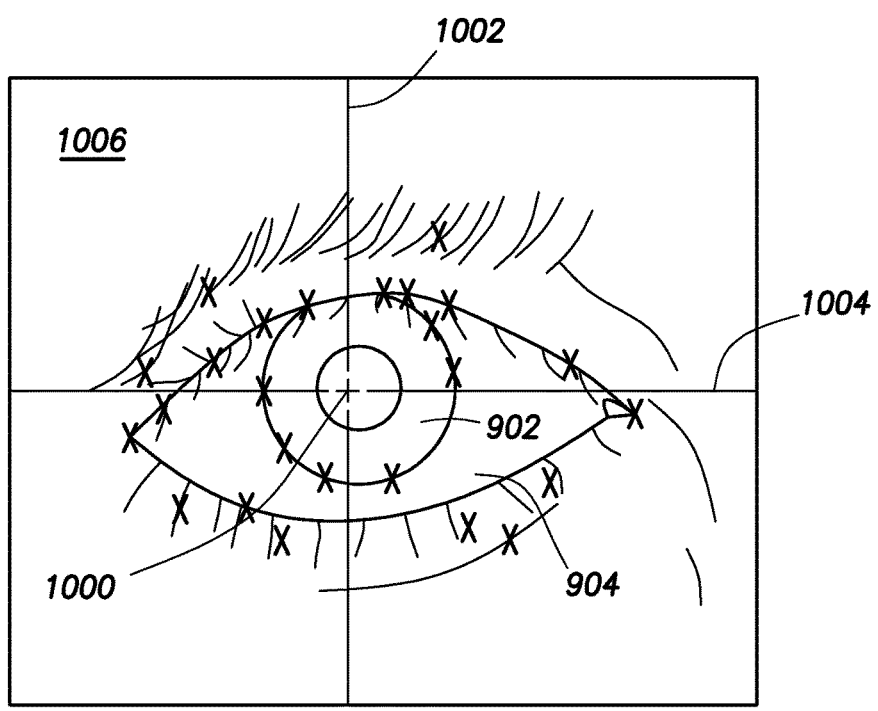
FIG. 10 shows an image of a user's eye divided into sections and feature points in accordance with at least some embodiments.

Regardless of the accuracy of the second estimated pupil center position, the next step in the illustrative method is to logically divide the field into a plurality of sections (block 810). In many cases each section logically created will abut at the second estimated pupil center position. Both because the two-dimensional Cartesian coordinate system of the field easily divides parallel to each axis, and because of the illustrative mathematics used in later ellipse fitting, in some embodiments the field is divided into quadrants, as shown in FIG. 10. However, in other embodiments the field may be logically divided into any suitable number of sections, such as five sections, eight sections, or even two sections.

Referring to FIG. 10, FIG. 10 shows the eye of FIG. 9, along with the second estimated pupil center position 1000 and illustrative feature points (more features points shown in FIG. 10 than in FIG. 9). Moreover, FIG. 10 shows vertical line 1002 and horizontal line 1004, each of which pass through the second estimated pupil center position 1000. Line 1002 and line 1004 logically divide the field into quadrants. It is noted that lines 1002 and 1004 are not necessarily present in the field, but are shown in FIG. 10 to illustrate dividing the field into sections, here quadrants. FIG. 10 also shows many feature points, but in operation many hundreds or even thousands of feature points may be created. Moreover, the feature points are illustrated in FIGS. 9 and 10 within the field, but it is noted that feature points need not be physically placed in the image of the field, and instead may reside in a separate file or separate memory location.

As discussed above, the random aspect of RANSAC dictates selecting points at random from the set of feature points. The inventor of the current specification, however, has found that a purely random sampling of feature points has inherent shortcomings in that all the feature points selected may be grouped away from the pupil, rather than around the pupil (as would give a better estimate of pupil position). For example, using unmodified RANSAC, all the selected feature points could reside in only one illustrative quadrant (e.g., all the randomly selected points could reside in the upper-left quadrant 1006). At least some embodiments implement a modified RANSAC where at least one feature point is randomly selected from each section (as illustrated each quadrant) to increase the chances that the feature points selected are from various locations surrounding the pupil. Each illustrative quadrant of FIG. 10 has feature points at the interface of the iris 902 and sclera 904, but each illustrative quadrant also has feature points at incorrect locations (such as on eye lashes). Thus, while forcing selection of at least one feature point from each section increases the likelihood of selecting better feature points, there are still no guarantees.

Returning to FIG. 8, the next step in the illustrative method is selection of at least one feature point from each section, and fitting an ellipse to the selected feature points (block 812). While possible to use a least squares method to fit an ellipse to the selected feature points, at least some embodiments perform singular value decomposition using the selected feature points. In particular, singular value decomposition to determine an ellipse is a matrix operation that takes as input only five points, and determines an ellipse from the only five points. Singular value decomposition is computationally easier to perform than other curve fitting methods (e.g., least squares), and thus is a favored method of ellipse fitting. In embodiments that logically divide the field (and more particularly the spatially diverse feature points) into quadrants, one feature point from each quadrant is used, along with a randomly selected feature point from any quadrant. In embodiments that logically divide the field into five sections, one feature point from each quadrant is used. Other variants are possible, such as two sections with two feature points from each section and a randomly selected feature point.

After calculating an ellipse, the next step in the illustrative method is to calculate an indication of consensus of the ellipse with most if not all feature points (block 814). Stated otherwise, the indication of consensus in some embodiments is a numerical value that indicates how well the ellipse matches most if not all the feature points. In some cases, the indication of consensus for an ellipse involves calculating a radial distance from the ellipse to each feature point, and combining the distances in some form, but other mechanisms to generate the indication of consensus may be equivalently used. An identification of the ellipse and its indication of consensus are stored.

The next step in the illustrative method is making a determination of whether more time is available (block 816), and if more time is available the method retreats to selecting a new set of feature points from the sections (again block 812) and calculating indication of consensus (again block 814). That is, the illustrative method calculates as many ellipses (and corresponding indications of consensus) as time will allow. Assuming no processor loading and/or scheduler issues, the illustrative method calculates as many ellipses and corresponding indications of consensus as possible before the next field arrives (e.g., as many as possible in about $1/50^{th}$ of a second). In other cases, the field rate may not be the limiting factor, and instead the timing for preemption of the thread that executes the illustrative field-level pupil position module 408 may be the limiting factor. Using a high-end, multi-processor core computer system for computer system 100, about 1000 ellipses could be calculated before preemption of the thread performing the functions of the field-level pupil position module 408. However, by dividing the image into sections (and in particular quadrants in this example), sufficiently accurate pupil positions were found. By contrast, pure RANSAC (i.e., used without the sections) needs on average significantly more than 1000 loops, and in some cases 10,000 loops, to find pupil center positions with comparable accuracy to the various embodiments selecting points within sections or quadrants.

Regardless of the limiting factor for the number of ellipses to calculate, once time is running short (again block 816), the illustrative method selects the ellipse with the best indication of consensus, and sets the pupil center position for the field as the center of the selected ellipse (block 818). In some cases, a pupil position may not be found (e.g., user is blinking), thus if a pupil center is found (block 820) the next illustrative step is to output to the pupil center position (block 822), such as providing the pupil center position to the frame-level pupil position module. If no pupil center position was found (again block 820), the illustrative method begins anew.

Before proceeding, a few additional points are in order. Firstly, for purposes of discussion the field-level pupil position module 408 and the frame-level pupil position module 406 are discussed separately; however, in other cases the field- and frame-level determinations may be integrated into a single routine. In cases where the video camera provides non-interlaced video (e.g., a high resolution digital camera is used), the pupil position may be determined within each frame using the method as described, and such would not depart from the scope and spirit of the various embodiments. The specification now turns to the render module 410.

Render Module

Render module 410, in accordance with at least some embodiments, is responsible for reading fields from the bridge driver module 412, converting the fields to monochrome, and passing the fields to the field-level pupil position module 408. That is, in some cases each field compiled by the bridge driver 412 may have color components embedded, even if the field itself is effectively monochrome because of the use of an infrared filter. In some cases, the color components are stripped by the render module, leaving one luma byte for each pixel in the field. In some embodiments, the bridge driver 412 places fields in a predetermined memory location, and the render module reads the field, strips the color components, and places the stripped field at a different predetermined location in memory, where the field-level pupil position module 408 can read the field. Other mechanisms for providing the field to the field-level pupil position module may be used. The specification now turns to the bridge driver 412.

Bridge Driver

As discussed above, in embodiments utilizing an analog camera 114 the expansion device 128 reads the analog signals and creates digital representations of each field. However, the inventor of the present specification is not aware of any other eye tracking system that makes field-level pupil position determinations. That is, to the extent any other eye tracking system has used an analog camera, to the best of the knowledge of the inventor the pupil position determinations are made only at the frame level after the fields have been combined into the frame. The position is buttressed by the fact that all commercially available expansion devices which the inventor could find are programmed (or come with software drivers) that combine the fields into a single frame before providing the frame to downstream software.

Thus, in accordance with at least some embodiments the cursor position control software 400 interfaces with the hardware of the expansion device 128 such the expansion device 128 and bridge driver 412 can produce digital representations of each field of a frame. In some embodiments, the individual fields are not combined to create a single frame image. One having ordinary skill in the art, now understanding that pupil position may be determined within each field and the pupil positions combined to get a frame-level pupil position (even if the fields themselves are not combined into a frame) could create a driver to interface with the expansion device 128 hardware to provide digital representations of each field. The specification now turns to the snap-to module 414.

Snap-to Module

The various embodiments discussed to this point have been directed to moving the cursor on a display device in real time with movement of pupil position relative the face of the user. That is, in the various embodiments discussed to this point movement of the cursor on the display device is directly related to pupil position with respect to the face. However, in order to make cursor placement more efficient, particularly cursor placement upon user interface widgets (e.g., a screen object) that may be "clickable", in accordance with at least some embodiments moving the cursor further comprises relocating the cursor from a position suggested by the position module 402 to a user interface widget within a predetermined distance from the cursor position suggested by the position module 402. Stated otherwise, the cursor position control software 400 takes into account a cursor position suggested by the position module 402, but then may in some circumstances relocate the cursor independent of pupil position changes to a nearby user interface widget. Thus, though fine cursor position control may be implemented using the vestibulo-ocular reflex, additional movement of the cursor may also be used.

Figure 11:
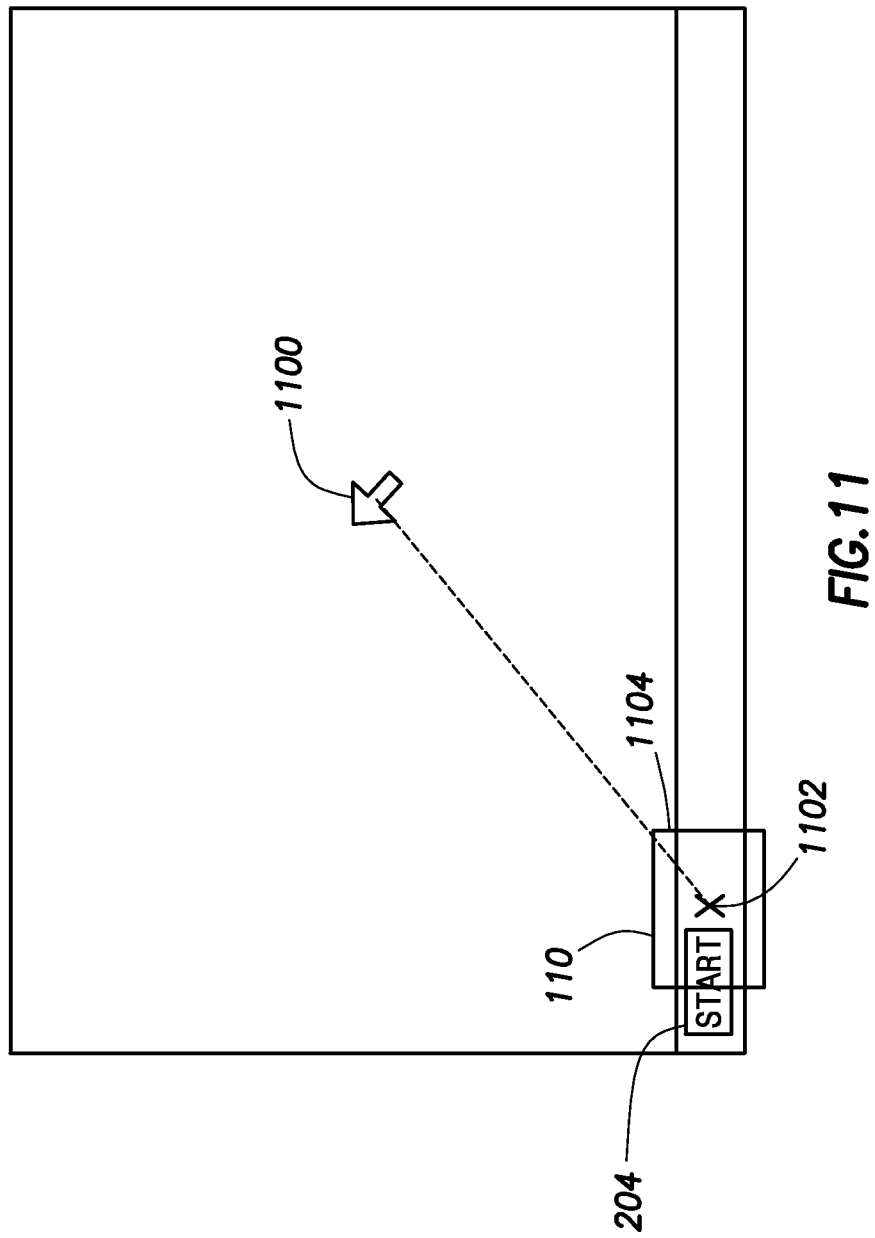
FIG. 11 shows a display device to explain operation of the snap-to feature in accordance with at least some embodiments.

FIG. 11 shows a graphical illustration of operation of the snap-to module 414. In particular, consider that the user has tied a pupil position relative to the face to the cursor 1100 position as shown, and then moves the eye to gaze upon the start button 204. Responsive to the change in pupil position, the position module 402 may suggest a cursor position indicated by the "X" 1102 in FIG. 11. However, the snap-to module 414 is configured to analyze an area of predetermined size around the cursor (or the suggested cursor position), and suggest positional changes for the cursor. In the example of FIG. 11, the area analyzed is illustratively bounded by box 1104. The size of the predetermined area is exaggerated for purposes of discussion, and in operation may be on the order of 16×16 pixels; however, larger and smaller predetermined areas may be used depending on the resolution of the display device.

Based on an analysis of the predetermined area, the snap-to module 414 may suggest a different cursor position such that the cursor will overlay a user interface widget, such as one of the letters within the start button 204. Thus, using pupil position relative to the face and the effects of the vestibulo-ocular reflex the user may place the cursor close to the desired location, and the extra-fine cursor movement may then be implemented by the cursor position control software 400 responsive to determinations of the snap-to module 414. Moreover, the cursor position control software 400, responsive to the snap-to module 414, may selectively refrain from cursor movement in spite of changes in position suggested by the position module 402. That is, whether the user intends to physically "click" the user interface widget, or plans to issue a verbal command to perform the "click" operation, a finite amount of time is needed to receive the command, and thus in spite of pupil position changes, once the cursor is located on a user interface widget the cursor position control software may refrain from moving the cursor to allow time to read other commands.

Figure 12:
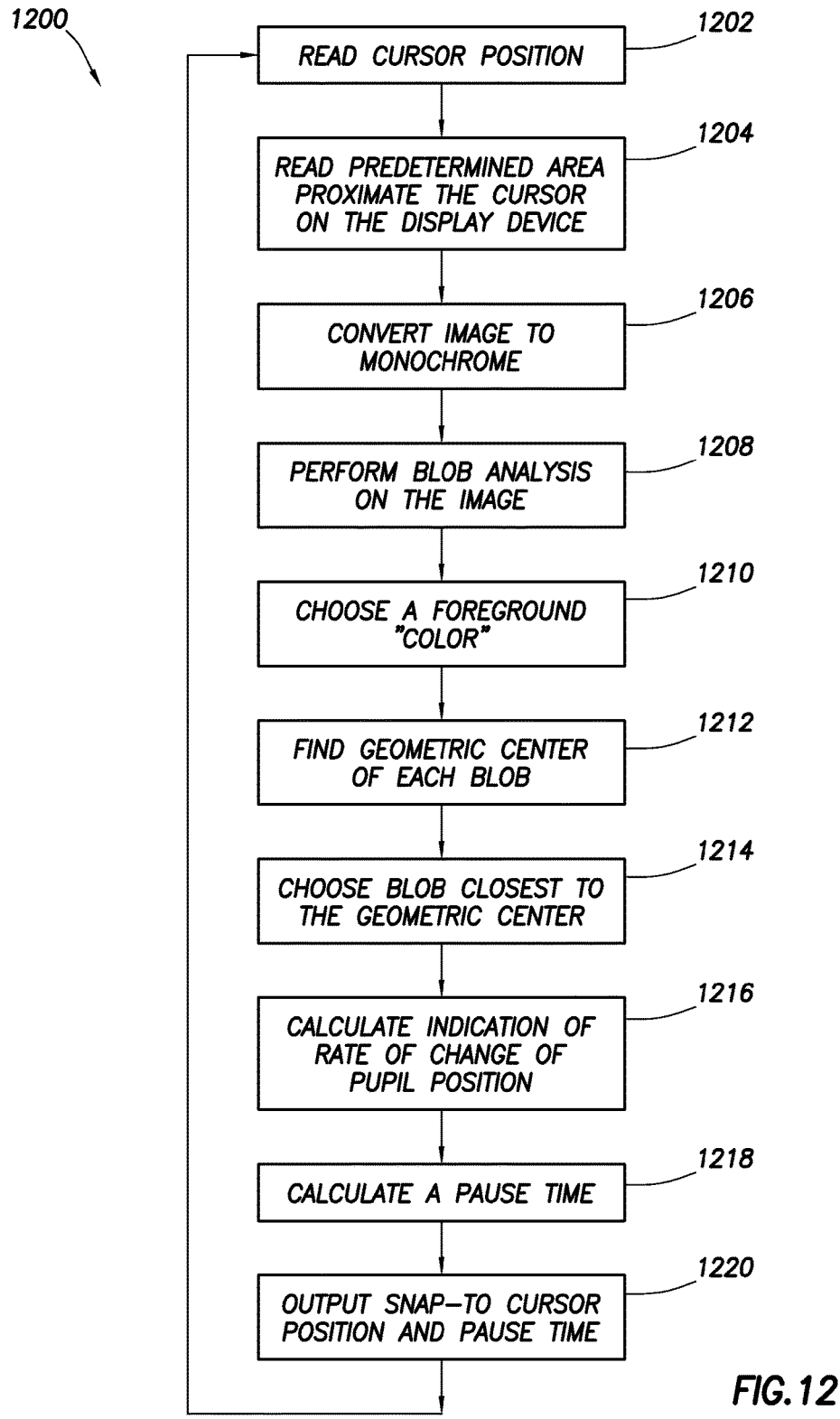
FIG. 12 shows a flow diagram of operation of a snap-to module in accordance with at least some embodiments.

FIG. 12 shows a flow diagram 1200 of operation of the snap-to module 414 in accordance with at least some embodiments. The illustrative method starts by reading cursor position (block 1202). The reading of cursor position may take many forms. In some cases, the illustrative method may read the cursor position proposed by the position module 402. In these embodiments, the cursor position may or may not have been actually implemented by the cursor position control software 400. In other cases, the illustrative method may read the cursor position directly by way an operating system call.

Regardless of the precise mechanism by which cursor position is read, the next step in the illustrative method is reading a predetermined area proximate the cursor on the display device (block 1204). Box 1104 of FIG. 11 is illustrative of an area around the cursor that may be read. More particularly, the illustrative method involves reading a predetermined area around the active portion of the current cursor. For illustrative cursor 108, the "active portion" is in most cases the point of the arrow. For other cursor shapes (e.g., an "insert" cursor comprising a vertical line), other active portion may be the upper portion of the vertical line. The predetermined area may take any suitable size. On the display device upon which the various embodiments were initially developed—an Apple® laptop computer having a display device with 1920×1024 resolution—the predetermined area selected was a 16×16 pixel area centered at the active portion of the cursor. For a 16×16 pixel area, the distance from the cursor to a most remote portion of the area may be about 11 pixels. The size of the predetermined area may be selected based on the size of user interfaces widgets on the display device, and may change for different screen resolutions and font sizes.

The next step in the illustrative method comprises converting the image proximate the cursor to monochrome (block 1206). That is, in most cases the display device of a computer system on which the method is practiced will be a color display device showing color images. Inasmuch as the snap-to module is merely concerned with screen objects in proximity to the cursor position independent of color, conversion to monochrome may make the determinations of the snap-to module 414 less computationally intensive. However, in alternative embodiments the snap-to analysis may be completed with respect to a color image.

Once illustratively converted to monochrome, the method involves performing blob analysis on the image to identify entities within the image (block 1208). Experience indicates that in implementing the blob analysis on the image, entities only single pixel wide (e.g., a vertical line) or only a single pixel tall (e.g., horizontal lines) can be ignored, as such single-pixel entities are usually not "clickable" user interface widgets.

The next issue involves selection of a foreground "color". "Color" in this instance refers to the difference between the monochromatic elements (e.g., black and white), and shall not be read to require use of a color image. With respect to the foreground "color" issue, in a relatively small image upon which blob analysis has been performed, it may not be abundantly clear whether the objects of interest are the dark objects on a light background, or light objects on a dark background. Thus, in accordance with at least some embodiments the illustrative method comprises choosing the foreground "color" (block 1210). Choosing the foreground color may take many forms, but in one case involves counting the number of lighter blobs in the image, and counting the number of darker blobs in the image, with the foreground "color" selected based on which "color" has the most blobs in the image.

Once the foreground "color" is determined, the next step in the illustrative method comprises finding the geometric center of each blob in the selected foreground (block 1212). Thereafter, the illustrative method chooses a blob that is closest to the geometric center of the overall image (block 1214). That is, a blob is selected that is closest to the active portion of the cursor. The selected blob thus represents a location to which the user may have been trying to place the cursor, but because of uncertainties in pupil position determination and the way the position module 402 generates suggested cursor positions, the cursor position may not exactly correspond to gaze direction. Thus, the snap-to module 414 may calculate a new recommended cursor position, and output the proposed cursor position (block 1220). However, in order to give the user time to activate the user interface widget to which the cursor is moved, the method may further comprise calculation and implementation of pause time.

In particular, the illustrative method may involve calculating an indication of the rate of change of pupil position (block 1216) over a predetermined period of time, or equivalently over a predetermined number of frames. Calculating the indication of rate of change of pupil position may take many forms. In one example embodiment, the indication of rate of change involves calculating the standard deviation of the X position of the pupil over a predetermined number of frames, and likewise calculating the standard deviation of the Y position of the pupil over a predetermined number of frames. The standard deviations may be then be combined in some way (e.g., averaged), which combined standard deviation is thus the indication of rate of change of pupil position in these embodiments. Other mechanisms to calculate the indication of rate of change may be used, such as mathematical derivatives. In some embodiments, the snap-to module 414 independently calculates the indication of rate of change of pupil position, but in other cases the indication of rate of change of pupil position may be the same indication calculated by the jitter control module 404, and passed from the jitter control module 404 to the snap-to module 414 (or vice-versa).

Regardless of how the indication of rate of change of pupil position is calculated, the next step in the illustrative method involves calculating a pause time (block 1218). In some cases, the pause time is indirectly related to the indication of rate of change. That is, for high rates of change of pupil position (indicating the user is implementing bulk changes in cursor position), a zero pause time may be suggested by the snap-to module 414. Conversely, when the rate of change of pupil position is low (indicating the user is attempting to finely place the cursor), high pause times (e.g., 0.5 second) may be implemented to allow time for "clicking" of the user interface widget and/or invoking a voice command.

In one illustrative embodiment, the X position standard deviation is calculated, along with the Y position standard deviation. The standard deviations are then averaged to arrive at an averaged standard deviation. The average standard deviation may then be truncated to become an integer. In such illustrative embodiments, the pause time may be selected as follows: average standard deviation=1, snap-to module proposes 0.5 second pause time; average standard deviation=2, snap-to module proposes 0.25 second pause time; average standard deviation=3, snap-to module proposes 0.125 second pause time; average standard deviation=4, snap-to module proposes 0.0625 second pause time; and average standard deviation>4, snap-to module proposes zero or no pause time.

Thereafter, the snap-to module outputs a proposed snap-to cursor position and proposed pause time (block 1220). The cursor position control software may implement the proposed snap-to locations and pause times, or may choose not to implement the snap-to location (e.g., when a pause time of zero is recommended).

Much like the jitter control module 404 and the frame-level pupil position module 406, in the ideal case the snap-to module 414 runs with respect to each frame-level pupil position created by the frame-level pupil position module 406 (e.g., about 50 frames per second). Again however, depending on the operating system type, processor performance, and other factors, the snap-to module 414 may not be scheduled to operate often enough to determine a new proposed snap-to position and pause time each and every frame—in some cases snap-to determinations for some frames may be missed. Moreover, even if the snap-to module 414 runs often enough, the upstream components may have preemption issues in attempting to provide fields for analysis. The specification now turns to the voice control module 416.

Voice Control Module

The voice control module 416 is responsible for reading and interpreting voice commands associated with cursor control actions. The voice commands, however, are not limited solely to spoken and recognizable words, as one embodiment implements cursor control actions based on what will be termed herein impulse sound—relatively short, high audio volume or intensity peak, sounds such as claps or grunts. Audio frames may originate from microphone 132 on the headset 104 (and thus be transmitted along with the video frames), or the audio frames may originate from a different microphone, such as a microphone of the computer systems. Regardless of the point of origin, the sounds are analyzed and various commands may be implemented.

Figure 13A:
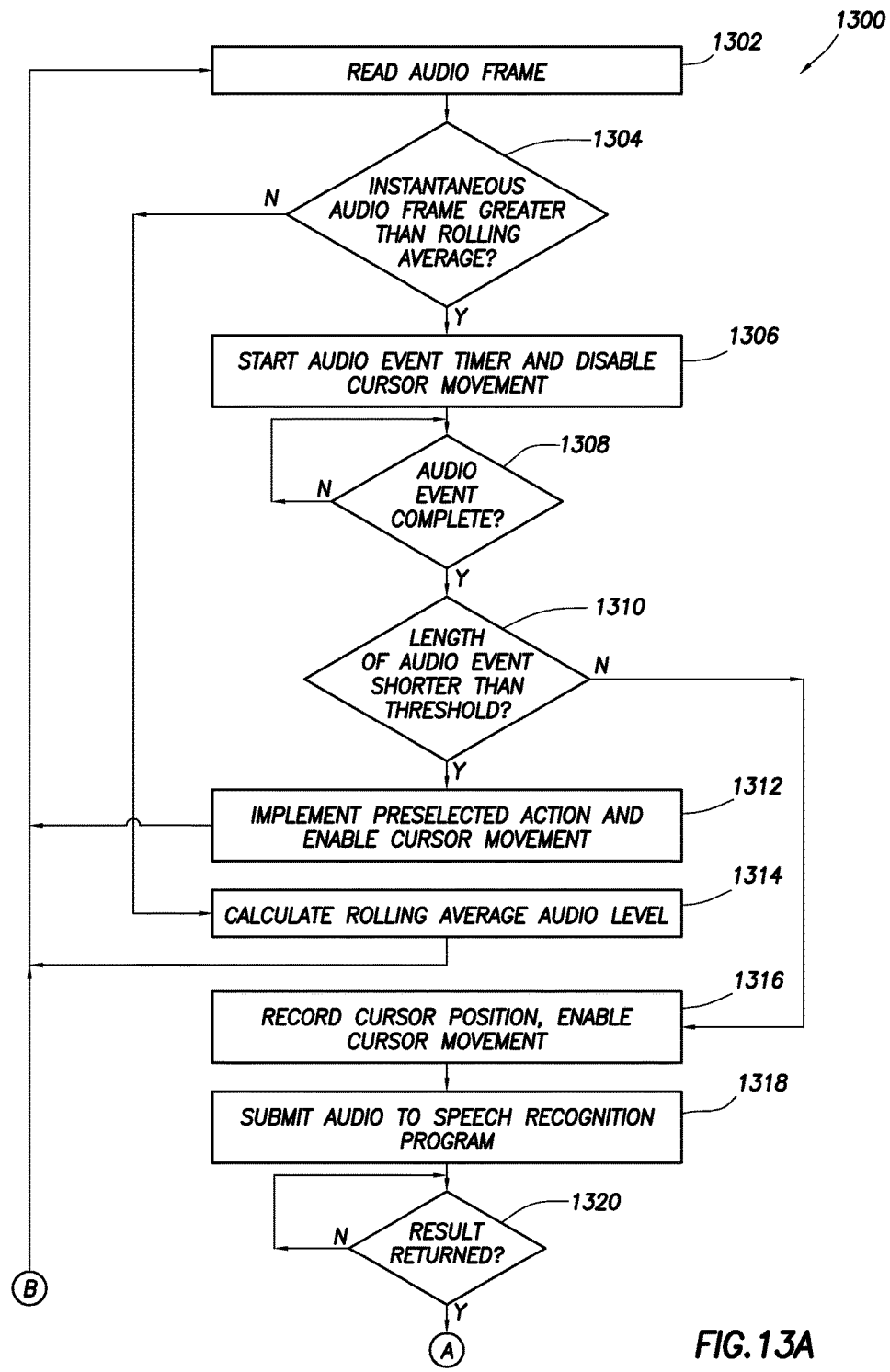
FIG. 13 (comprising FIGS. 13A and 13B) shows a flow diagram of operation of a voice control module in accordance with at least some embodiments.
Figure 13B:
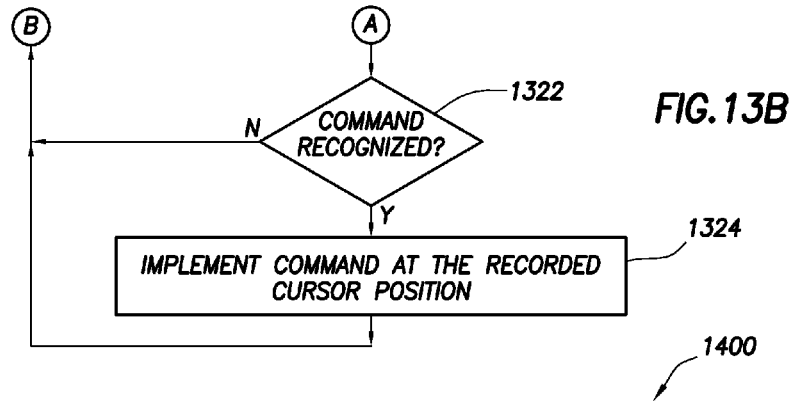

FIG. 13 (comprising FIGS. 13A and 13B) shows a flow diagram 1300 of operation of the voice control module 416 in accordance with at least some embodiments. The illustrative method starts by reading an audio frame 1302. Audio frames have frame rates on the order of 16 frames a second. The next step in the illustrative method involves determining whether the instantaneous audio peak in the audio frame is greater than a predetermined threshold (block 1304), and in some cases the predetermined threshold is a rolling average audio peak. In words, during periods of time when the user is moving the cursor but not issuing verbal commands, a threshold level of noise may exist in the audio stream. Once the user issues a verbal command, such as an impulse sound or the beginning of an extended voice command (e.g., speaking a command word), the audio peak will rise above the noise threshold, thus indicating that the user is issuing some form of verbal command. If the instantaneous audio peak is not above the predetermined threshold (again block 1304), the illustrative method calculates the rolling average audio level using the audio frame (block 1314), and then process repeats by reading the next audio frame (1302).

Returning again to the decision block 1304. In the event the instantaneous audio peak exceeds the predetermined threshold, the illustrative method proceeds to starting an audio event timer and disabling cursor movement (block 1306). The audio event timer may help distinguish impulse sounds from spoken verbal command words, and is discussed more with respect to block 1310. Disabling the cursor movement gives the method an opportunity to at least partially decode the verbal command issued in the event the command is with respect to the current cursor position on the display device. Stated otherwise, cursor movements may be implemented at the video frame rate of about 25 frames per second, yet audio frames are received at about 16 frames per second, and decoding commands takes a finite amount of time. In the event the verbal command is with respect to a particular cursor position, cursor movement may be disabled to allow time to decode the command.

The illustrative method then loops waiting for the audio event to complete (block 1308). That is, in some cases the method may loop until the audio peak in received audio frames falls below the predetermined threshold. Though not expressly shown in FIG. 13A so as not to unduly complicate the figure, additional audio frames are read as part of the determination of whether the audio event has completed. When the audio event completes, a decision is made as to whether the length of the audio event was shorter than a predetermined threshold (block 1310). That is, impulse sounds as verbal commands will have shorter duration than verbal commands involving speaking a command word. Thus, if the length of the audio event is less than the predetermined threshold, the method assumes the audio event was an impulse sound, and the method steps to implementing a preselected action at the cursor position and enabling cursor movement (block 1312). The preselected action could take many forms. Some illustrative preselected actions comprise: simulating a mouse click; simulating a mouse double-click; simulating a mouse left button click; simulating a mouse left button double-click; simulating a mouse right button click; simulating a mouse right button double-click; and simulating pressing of a key of the keyboard. The precise action utilized may be selected from a list of commands from a menu. Regardless of the precise preselected action taken in view of the impulse sound, the illustrative method may then begin again by reading the next audio frame (block 1302).

Returning to the decision block 1310, if the length of the audio event was longer than the predetermined threshold (again block 1310), the next step in the illustrative method is to record the cursor position, and enable cursor movement (block 1316). That is, upon reaching illustrative block 1316, a verbal command has been received that is longer than an impulse sound, but having cursor movement disabled during decoding the verbal command may make the computer system seem non-responsive. Moreover, the verbal command may not be one of the recognized commands. As the cursor thus continues to move responsive to pupil position changes (if any), the portion of the audio stream containing the verbal command is submitted to a voice recognition program (block 1318). Any currently available or after-developed voice recognition program may be used. One example embodiment utilizes the CMU Sphinx speech recognition developed by Carnegie Mellon University.

While any number of recognizable voice commands may be used, in some embodiments the voice commands are limited so as to make the voice recognition program more responsive. For example, some embodiments may have 10 phrases or less, such as: scroll up; scroll down; keyboard; activate (illustratively used to tie the cursor position to the pupil position); click; right click; and double click. Other verbal command phrases are possible.

The illustrative method then loops waiting for the result from the speech recognition program (block 1320). When the results are returned, a decision is made as to whether the verbal command matched one of the phrases (block 1322 in FIG. 13B). If the command was recognized, the illustrative method moves to implementing the command at the recorded location of the cursor 1324. That is, between when the cursor movement is enabled (block 1316) and when the results are returned and analyzed (block 1322), the cursor may have moved positions, and thus for recognized commands those commands may be location specific.

If a command was not recognized (again block 1322), or after a recognized command is implemented (again block 1324), the illustrative begins again by read more audio frames (block 1302).

Example Computer System

Figure 14:
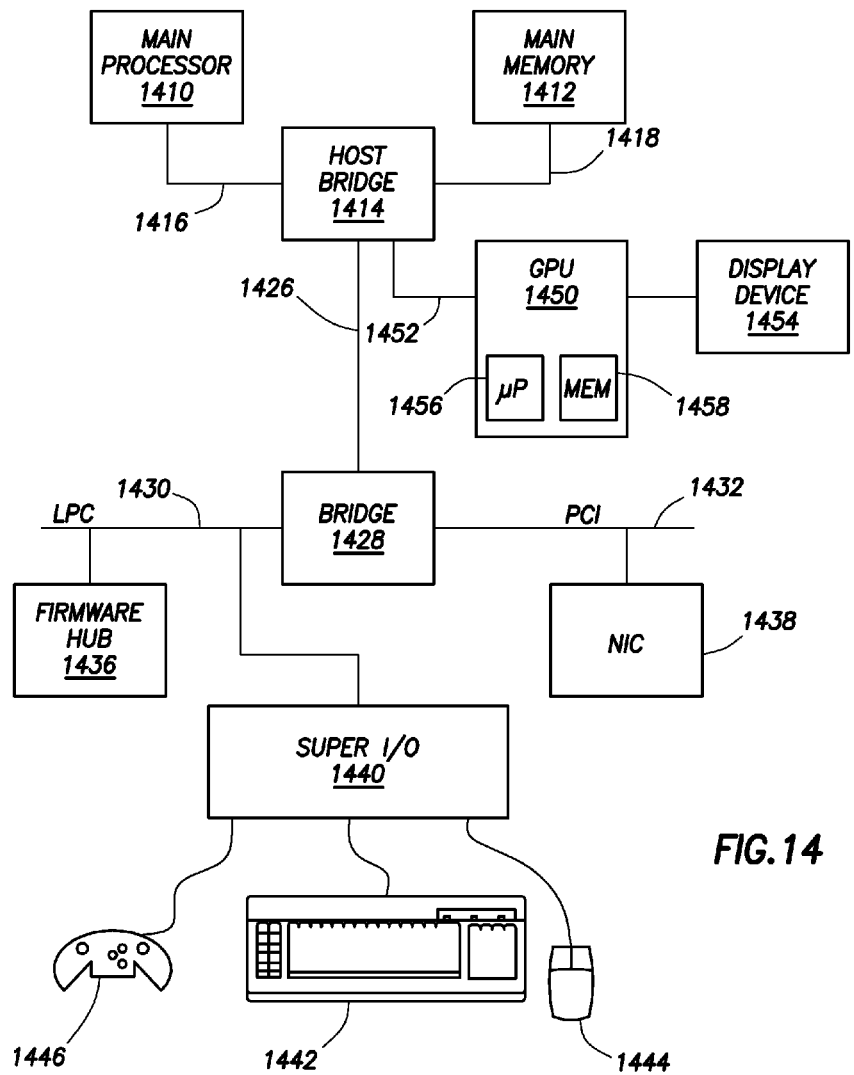
FIG. 14 shows a computer system in accordance with at least some embodiments.

FIG. 14 illustrates a computer system 1400 in accordance with at least some embodiments. At least some of the embodiments of controlling cursor position on the display device based on pupil position with respect to the head or face may be implemented in whole or in part on a computer system such as that shown in FIG. 14, or after-developed computer systems. In particular, computer system 1400 comprises a main processor 1410 coupled to a main memory array 1412, and various other peripheral computer system components, through integrated host bridge 1414. The main processor 1410 may be a single processor core device, or a processor implementing multiple processor cores. Furthermore, computer system 1400 may implement multiple main processors 1410. The main processor 1410 couples to the host bridge 1414 by way of a host bus 1416, or the host bridge 1414 may be integrated into the main processor 1410. Thus, the computer system 1400 may implement other bus configurations or bus-bridges in addition to, or in place of, those shown in FIG. 14.

The main memory 1412 couples to the host bridge 1414 through a memory bus 1418. Thus, the host bridge 1414 comprises a memory control unit that controls transactions to the main memory 1412 by asserting control signals for memory accesses. In other embodiments, the main processor 1410 directly implements a memory control unit, and the main memory 1412 may couple directly to the main processor 1410. The main memory 1412 functions as the working memory for the main processor 1410 and comprises a memory device or array of memory devices in which programs, instructions and data are stored. The main memory 1412 may comprise any suitable type of memory such as dynamic random access memory (DRAM) or any of the various types of DRAM devices such as synchronous DRAM (SDRAM), extended data output DRAM (EDO-DRAM), or Rambus DRAM (RDRAM). The main memory 1412 is an example of a non-transitory computer-readable medium storing programs and instructions, and other examples are disk drives and flash memory devices.

The illustrative computer system 1400 also comprises a second bridge 1428 that bridges the primary expansion bus 1426 to various secondary expansion buses, such as a low pin count (LPC) bus 1430 and peripheral components interconnect (PCI) bus 1432. Various other secondary expansion buses may be supported by the bridge device 1428 (e.g., Universal Serial Bus (USB), IEEE 1394 Firewire bus).

Firmware hub 1436 couples to the bridge device 1428 by way of the LPC bus 1430. The firmware hub 1436 comprises read-only memory (ROM) which contains software programs executable by the main processor 1410. The software programs comprise programs executed during and just after power on self test (POST) procedures. The POST procedures perform various functions within the computer system before control of the computer system is turned over to the operating system. The computer system 1400 further comprises a network interface card (NIC) 1438 illustratively coupled to the PCI bus 1432. The NIC 1438 acts to couple the computer system 1400 to a communication network, such the Internet, or local- or wide-area networks.

Still referring to FIG. 14, computer system 1400 may further comprise a super input/output (I/O) controller 1440 coupled to the bridge 1428 by way of the LPC bus 1430. The Super I/O controller 1440 controls many computer system functions, for example interfacing with various input and output devices such as a keyboard 1442, a pointing device 1444 (e.g., mouse), a pointing device in the form of a game controller 1446, various serial ports, floppy drives and disk drives. The super I/O controller 1440 is often referred to as "super" because of the many I/O functions it performs.

The computer system 1400 may further comprise a graphics processing unit (GPU) 1450 coupled to the host bridge 1414 by way of bus 1452, such as a PCI Express (PCI-E) bus or Advanced Graphics Processing (AGP) bus. Other bus systems, including after-developed bus systems, may be equivalently used. Moreover, the graphics processing unit 1450 may alternatively couple to the primary expansion bus 1426, or one of the secondary expansion buses (e.g., PCI bus 1432). The graphics processing unit 1450 couples to a display device 1454 which may comprise any suitable electronic display device upon which the cursor along with any image or text can be plotted and/or displayed. The graphics processing unit 1450 may comprise an onboard processor 1456, as well as onboard memory 1458. The processor 1456 may thus perform graphics processing, as commanded by the main processor 1410. Moreover, in some cases the graphics processor 1456 may perform functions related to moving cursor position responsive to pupil position changes, such as the functions associated with the snap-to module 414. Further, the memory 1458 may be significant, on the order of several hundred megabytes or more. Thus, once commanded by the main processor 1410, the graphics processing unit 1456 may perform significant calculations regarding graphics on the display device without further input or assistance of the main processor 1410.

In the specification and claims, certain components may be described in terms of algorithms and/or steps performed by software that may be provided on a non-transitory storage medium (i.e., other than a carrier wave or a signal propagating along a conductor). The various embodiments also relate to a system for performing various steps and operations as described herein. This system may be a specially-constructed device such as an electronic device, or it may include one or more general-purpose computers that can follow software instructions to perform the steps described herein. Multiple computers can be networked to perform such functions. Software instructions may be stored in any computer readable storage medium, such as for example, magnetic or optical disks, cards, memory, and the like.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, while the field-level pupil position module in not concerned with glints and therefore does not perform glint removal as part of pupil position determination within each field, glint removal for purposes of increases pupil position determination accuracy may be implemented. It is intended that the following claims be interpreted to embrace all such variations and modifications.

What is claimed is:
1. A method comprising:
creating a first video stream, the first video stream depicting an eye of user of a computer system, wherein a pupil of the eye changes position relative to a face of the user during use of the computer system by the user;
tracking, by the computer system, pupil position relative to the face of the user, the tracking by way of the first video stream;
moving, by the computer system, a cursor position on a display device, the moving responsive to changes in pupil position relative to the face of the user, and the moving in real time with pupil position changes; and when gaze location on the display device does not match cursor position adjusting cursor position based on the vestibulo-ocular reflex, the adjusting cursor position takes place while the user holds a constant gaze location on the display device.

2. The method of claim 1 further comprising, prior to moving the cursor, tying a pupil position relative to the face to only one cursor position of a cursor on the display device.

3. The method of claim 2 wherein moving further comprises moving the cursor position proportional to a ratio of the frame size of the first video stream and screen size of the display device.

4. The method of claim 1 wherein moving further comprises relocating the cursor to a screen object within a predetermined distance, the relocating independent of pupil position changes.

5. The method of claim 4 wherein relocating the cursor independent of pupil position changes further comprises:
converting an area of predetermined size to a representation in monochrome, the predetermined size less than an entire field and less than an entire frame;
identifying candidate objects within the representation;
selecting one candidate object; and
relocating the cursor to the screen object that corresponds to the candidate object.

6. The method of claim 4 wherein relocating the cursor independent of pupil position changes further comprises relocating the cursor to the screen object within 11 pixels from the cursor on the display device.

7. The method of claim 1 further comprising:
detecting a verbal command of the user of the computer system; and
performing a control function at the location of the cursor based on the verbal command.

8. The method of claim 7 further comprising:
performing voice recognition on audio associated with the verbal command, the performing creates an indication of a recognized command from a predetermined list of commands; and
wherein performing further comprises performing the control function selected based on indication of the recognized command.

9. The method of claim 1 wherein creating the first video stream further comprises creating the first video stream by a camera on a headset, the camera held stationary with respect to the face of the user.

10. The method of claim 1 wherein creating the first video stream further comprises:
illuminating the eye with an infrared light source; and
creating the first video stream with a camera comprising a filter that filters out light in visible frequencies.

11. A system comprising:
a headset comprising:
a first portion configured to mount to a head of a user;
a camera coupled to the first portion, the camera configured to create a first video stream depicting an eye of user;
a computer system comprising:
a processor;
a memory coupled to the processor; and
a display device coupled to the processor, the display device mechanically coupled to the computer system such that head position changes of the user change position of the display device relative to the camera;

wherein the memory stores a program that, when executed by the processor, causes the processor to:
track pupil position relative to a face of the user, the tracking by way of the first video stream;
move a cursor position on the display device, the moving responsive to changes in pupil position relative to the face of the user, and the moving in real time with pupil position changes; and when gaze location on the display device does not match cursor position
adjust cursor position based on the vestibulo-ocular reflex, the adjustment to cursor position takes place while the user holds a constant gaze location on the display device.

12. The system of claim 11 wherein the program further causes the processor to, prior to moving the cursor, tie a pupil position relative to the face to only one cursor position of the cursor on the display device.

13. The system of claim 11 wherein when the processor moves the cursor the program further causes the processor to relocate the cursor to a screen object within a predetermined distance from the cursor, the relocation independent of pupil position changes.

14. The system of claim 13 wherein when the processor relocates the cursor independent of pupil position, the program further causes the processor to:
convert an area of predetermined size to a representation in monochrome;
identify candidate objects within the representation;
select one candidate object; and
relocate the cursor to the screen object that corresponds to the candidate object.

15. The system of claim 11 wherein the program further causes the processor to:
detect a verbal command of the user of the computer system; and
perform a control function at the location of the cursor based on the verbal command.

16. A product comprising:
a headset comprising:
a first portion configured to mount to a head of a user;
a camera coupled to the first portion, the camera configured to create a first video stream depicting an eye of user;
a non-transitory computer-readable medium storing a program that, when executed by a processor of a computer system, cause the processor to:
receive the first video stream from the headset;
track pupil position relative to a face of the user, the tracking by way of the first video stream;
move a cursor position on the display device, the moving responsive to changes in pupil position relative to the face of the user, and the moving in real time with pupil position changes; and; when gaze location on the display device does not match cursor position
adjust cursor position based on the vestibulo-ocular reflex, the adjustment to cursor position takes place while the user holds a constant gaze location on the display device.

17. The product of claim 16 wherein the program further causes the processor to, prior to moving the cursor, tie a pupil position relative to the face to only one cursor position of the cursor on the display device.

18. The product of claim 16 wherein when the processor moves the cursor the program further causes the processor to relocate the cursor to a screen object within a predetermined distance from the cursor, the relocation independent of pupil position changes.

19. The product of claim 18 wherein when the processor relocates the cursor independent of pupil position, the program further causes the processor to:
   convert an area of predetermined size to a representation in monochrome;
   identify candidate objects within the representation;
   select one candidate object; and
   relocate the cursor to the screen object that corresponds to the candidate object.

\* \* \* \* \*